(12) United States Patent
Hsieh

(10) Patent No.: US 11,324,326 B2
(45) Date of Patent: May 10, 2022

(54) MULTI-DIRECTIONAL ADJUSTABLE ARMREST PAD AND CHAIR ARMREST DEVICE WITH ARMREST PAD

(71) Applicant: Wen-Ping Hsieh, Taichung (TW)

(72) Inventor: Wen-Ping Hsieh, Taichung (TW)

(73) Assignee: Yi-Ru Chen, Taichung (TW)

( * ) Notice: Subject to any disclaimer, the term of this patent is extended or adjusted under 35 U.S.C. 154(b) by 275 days.

(21) Appl. No.: 16/807,185

(22) Filed: Mar. 3, 2020

(65) Prior Publication Data

US 2021/0274940 A1 Sep. 9, 2021

(51) Int. Cl.
*A47C 7/54* (2006.01)
*F16D 63/00* (2006.01)
*F16H 21/44* (2006.01)
*F16D 125/58* (2012.01)
*F16D 121/16* (2012.01)

(52) U.S. Cl.
CPC ............ *A47C 7/541* (2018.08); *F16D 63/006* (2013.01); *F16H 21/44* (2013.01); *F16D 2121/16* (2013.01); *F16D 2125/582* (2013.01)

(58) Field of Classification Search
CPC .................................. A47C 7/54; A47C 7/541
USPC ..................................................... 297/411.37
See application file for complete search history.

(56) References Cited

U.S. PATENT DOCUMENTS

| | | | | |
|---|---|---|---|---|
| 6,948,774 B2 * | 9/2005 | Maier | ...................... | A47C 1/03 297/411.37 X |
| 7,159,947 B1 * | 1/2007 | Lee | ...................... | A47C 1/0308 297/411.37 |
| 7,201,449 B2 * | 4/2007 | Tsai | ...................... | A47C 1/0308 297/411.37 X |
| 7,341,313 B2 * | 3/2008 | Bedford | ............... | A47C 1/0307 297/411.37 X |
| 7,360,839 B1 * | 4/2008 | Chen | ..................... | A47C 1/0308 297/411.37 X |
| 7,387,341 B1 * | 6/2008 | Tsai | ...................... | A47C 1/0307 297/411.37 |
| 7,559,609 B2 * | 7/2009 | Tsai | ...................... | A47C 1/0308 297/411.37 X |
| 7,815,259 B2 * | 10/2010 | Fookes | ............... | A47C 1/0307 297/411.37 X |
| 7,837,269 B2 * | 11/2010 | Bock | ........................ | A47C 1/03 297/411.37 X |
| 8,061,778 B2 * | 11/2011 | Machael | .................. | A47C 1/03 297/411.37 X |
| 8,403,417 B2 * | 3/2013 | Huang | ................. | A47C 1/0307 297/411.37 X |
| 8,960,801 B2 * | 2/2015 | Hu | .......................... | A47C 7/54 297/411.37 X |
| 9,004,603 B1 * | 4/2015 | Wang | ....................... | A47C 1/03 297/411.37 X |
| 10,143,310 B1 * | 12/2018 | Wang | ..................... | A47C 7/541 |
| 10,932,575 B2 * | 3/2021 | Masunaga | .............. | A47C 7/543 |

(Continued)

*Primary Examiner* — Rodney B White

(57) ABSTRACT

A multi-directional adjustable armrest pad and a chair armrest device with an armrest pad are disclosed and three embodiments are provided. In an embodiment, the pad body can be adjusted to move in a longitudinal direction and a lateral direction, and rotate relative to the chair armrest, and the pad body can be lifted by controlling a regulating assembly, and the regulating assembly is also rotatable and pivotally swingable, so as to make the armrest pad suit placement of a user's hand when the user sits on the chair.

3 Claims, 40 Drawing Sheets

(56) References Cited

U.S. PATENT DOCUMENTS

| | | | |
|---|---|---|---|
| 11,019,928 B2* | 6/2021 | Takagi | A47C 1/0308 |
| 11,166,563 B2* | 11/2021 | Chen | A47B 39/00 |
| 2004/0130200 A1* | 7/2004 | Willette | A47C 1/03 |
| | | | 297/411.37 |
| 2005/0184574 A1* | 8/2005 | Tsai | A47C 1/03 |
| | | | 297/411.37 |
| 2009/0033139 A1* | 2/2009 | Machael | A47C 1/0308 |
| | | | 297/411.37 |
| 2012/0025584 A1* | 2/2012 | Chen | A47C 1/0307 |
| | | | 297/411.37 |
| 2012/0175934 A1* | 7/2012 | Bock | A47C 1/0303 |
| | | | 297/411.37 |
| 2014/0145490 A1* | 5/2014 | Chen | A47C 1/03 |
| | | | 297/411.37 |
| 2019/0174921 A1* | 6/2019 | Chen | A47C 7/541 |
| 2021/0120958 A1* | 4/2021 | Chen | A47C 7/541 |
| 2021/0219729 A1* | 7/2021 | Bock | A47C 1/0308 |
| 2021/0259427 A1* | 8/2021 | Chen | A47C 7/541 |

* cited by examiner

MULTI-DIRECTIONAL ADJUSTABLE ARMREST PAD AND CHAIR ARMREST DEVICE WITH ARMREST PAD

BACKGROUND OF THE INVENTION

1. Field of the Invention

The present invention is related to a multi-directional adjustable armrest pad and a chair armrest device with the armrest pad and mainly related to technology in chair field, and is applicable to a chair, such as an office chair or a wheelchair, having an armrest for a user to place hand. The present invention is more particularly related to an armrest pad which can be adjusted and swung to most comfortably suit a placement position of the user's hand.

2. Description of the Related Art

Most armrests of many chairs in the market are mainly designed with height adjusting function, but the height adjusting function cannot satisfy users' requirement for comfort in recent years, so the manufacturers pay attention to the pads of the armrests where the hand rests, for example, the pads of the chair armrests are designed to provide users with different arm lengths to place hands comfortably. Taiwan Patent No. I414256, I353822, I468131, M420257, etc. disclose chairs with adjustable pads, for example, those patents disclose that the pads can be longitudinally and laterally shifted relative to the chair armrest, so as to provide users with different arm lengths to most comfortably place hands. However, the adjustments of hand placement for comfort do not just include longitudinal and lateral adjustments, for example, many users may have different hand postures due to different operating actions, and simple longitudinal and lateral movement adjustment of the pad can no longer satisfy the user's requirement in hand placement. Therefore, relevant manufacturers need to develop an improved armrest pad to provide a user to most comfortably place hand.

SUMMARY OF THE INVENTION

An objective of the present invention is to provide an armrest to suit a user's arm length and different action, so that the user can most comfortably lean and place hand on the armrest.

In order to achieve the objective, the present invention provides a multi-directional adjustable armrest pad mounted on a top end of a chair armrest. The multi-directional adjustable armrest pad includes a base plate, a pad body, and a slide control assembly. The base plate is sealed and assembled with a top face of the chair armrest and locked with the chair armrest, the base plate includes a locking pin protruded on a top thereof, an end of the locking pin is connected to the base plate and used as a positioning part, and the other end of the locking pin is used as a pivot part. The pad body is disposed on the top of the chair armrest and abutted with the base plate, the pad body comprises a receiving portion disposed in the inside thereof, and the receiving portion has a sliding hole cut therethrough a bottom thereof, and a through hole cut therethrough a lateral side thereof, the locking pin of the base plate is inserted through the sliding hole and located inside the receiving portion.

The slide control assembly is disposed in the receiving portion, and includes a press control member, a longitudinally-slidable plate, a horizontal sliding shaft set, two restraining teeth plates and a bottom base plate, a face of the longitudinally-slidable plate is attached with a bottom of the receiving portion, and the longitudinally-slidable plate has a slider protruded thereon and corresponding in position to the sliding hole, the slider has a longitudinal hole cut therethrough and corresponding in position to the locking pin, the slider is movable in the sliding hole, the locking pin is movable in a hole direction along the longitudinal hole, and the longitudinally-slidable plate comprises a plurality of engaging frames disposed on two ends of other face thereof and arranged in interval, and the slide control assembly comprises a surrounding wall surrounding and framing the plurality of engaging frames. Two ends of the bottom base plate are engaged with the plurality of engaging frames, respectively, and the bottom base plate comprises a lateral hole formed thereon and corresponding in position to the longitudinal hole, an end of the bottom base plate is engaged with the press control member, and the bottom base plate has a plurality of elastic pins protruded on other end thereof, an end of each of the plurality of elastic pins is connected to the bottom base plate, and other end of each of the plurality of elastic pins is elastically abutted against an inner wall of the receiving portion, and an end of the press control member is engaged with the bottom base plate, and other end of the press control member is inserted out of the through hole. The two restraining teeth plates are sandwiched between the bottom base plate and the longitudinally-slidable plate, and each of the two restraining teeth plates has a protrusion protruded thereon and corresponding to a side of the bottom base plate, and the bottom base plate has two tracks cut therethrough and corresponding in position to the protrusions of the two restraining teeth plates, respectively, and the two tracks are downwardly extended from the end, where the plurality of elastic pins are disposed, of the bottom base plate and then extended toward two sides of the bottom base plate, the two restraining teeth plates are moved close to or away from each other by moving the protrusions along the two tracks, each of the two restraining teeth plates has a teeth part disposed on a side thereof corresponding to the other of the two restraining teeth plates, and each of the two restraining teeth plates has an elastic member extended from an end thereof opposite to the teeth part, and each of the elastic members has an end connected to the restraining teeth plate and other end elastically abutted with the surrounding wall. The horizontal sliding shaft set is mounted on the locking pin and disposed between the two restraining teeth plates and in the lateral hole, the horizontal sliding shaft set further comprises a main body and a teeth disk member, the main body has a curved groove recessed thereon, and the main body has a lateral teeth row disposed on a side thereof and engaged with the teeth part of one of the two restraining teeth plates, the teeth disk member is assembled in the curved groove, the teeth disk member has a shaft hole cut therethrough, hole shapes of the shaft hole corresponds to that of the positioning part and the pivot part, and the teeth disk member is pivotally swingable relative to the main body and has an arc teeth-row disposed on a side thereof and engaged with the teeth part of the other of the two restraining teeth plates. When the press control member is pressed, engagements between the two restraining teeth plates and the horizontal sliding shaft set are released, the pad body is adjustable to move longitudinally and laterally and rotate about the chair armrest through cooperation between the longitudinal hole and the horizontal sliding shaft set, cooperation between the slider of the longitudinally-slidable plate and the through hole, and pivot cooperation between the main body and the teeth disk member.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
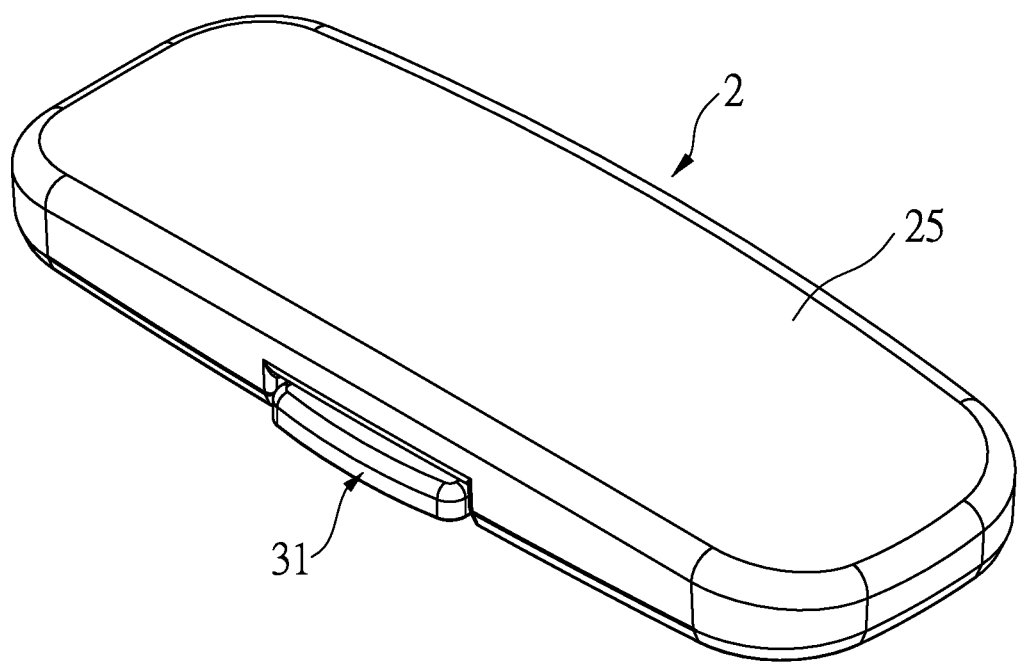
FIG. 1 is a perspective view of an embodiment of the present invention.
Figure 2:
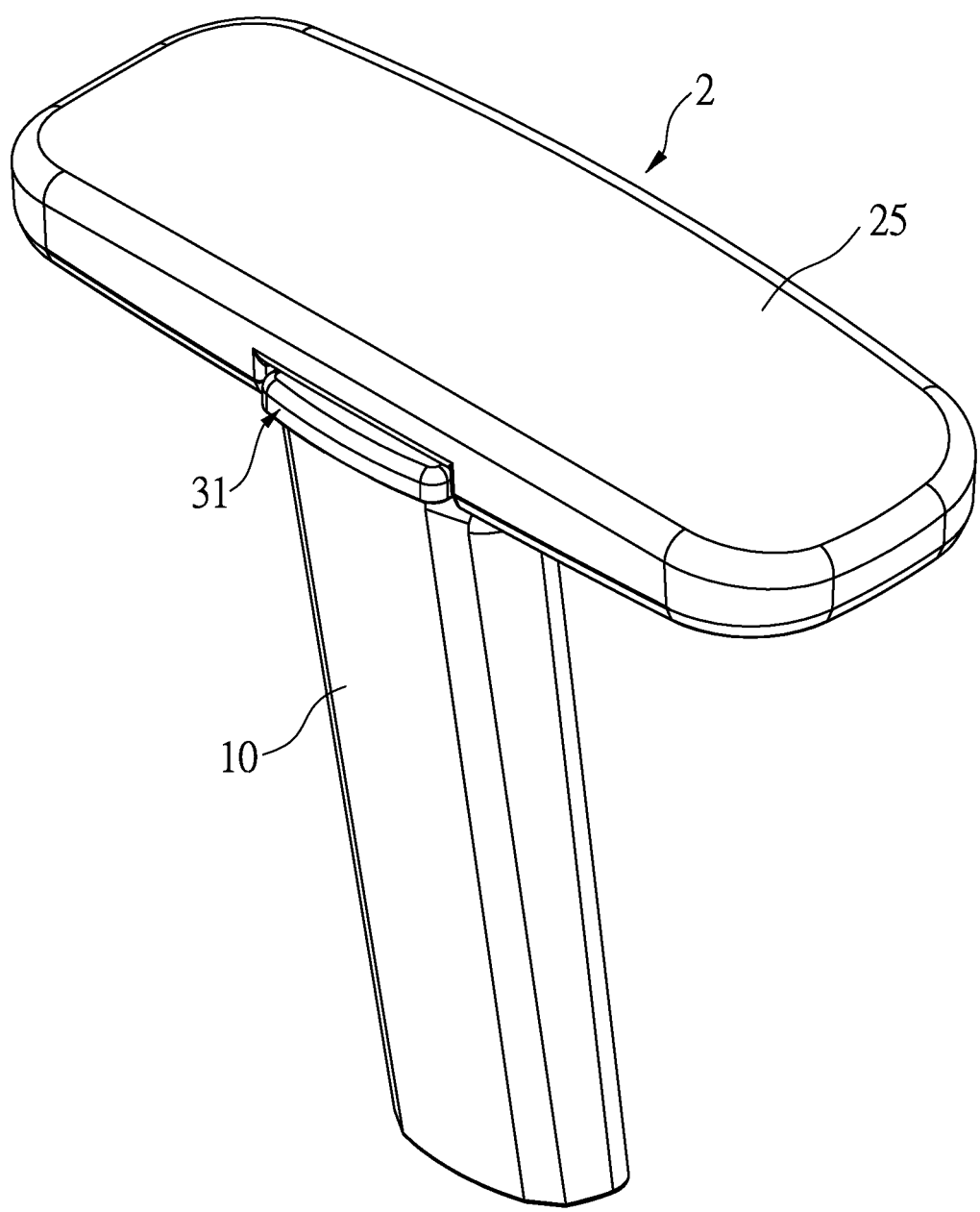
FIG. 2 is a perspective view of an armrest pad mounted on a chair armrest, according to the present invention.
Figure 3:
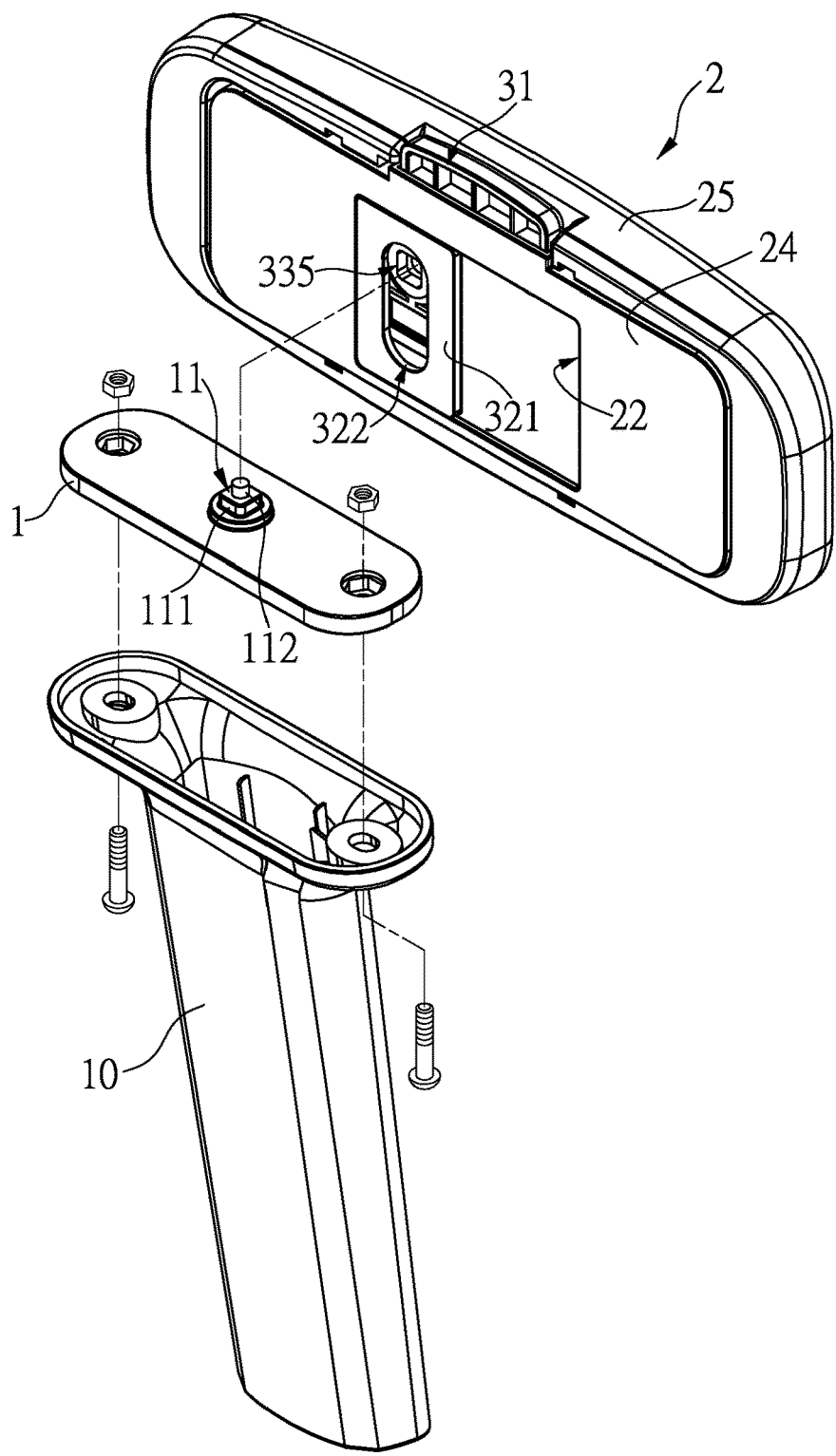
FIG. 3 is a perspective exploded view of major parts of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

Please refer to FIGS. 1 to 21. A multi-directional adjustable armrest pad of the present invention can be mounted on a top of a chair armrest 10, and the chair armrests 10 are disposed on two sides of a chair to provide a user to place hands, and each chair armrest 10 is retractable and pivotable to suit placement of the user's hand, and includes a base plate 1, a pad body 2 and a slide control assembly 3. The base plate 1 is sealed and assembled with a top face of the chair armrest 10 and locked with the chair armrest 10, and the base plate 1 includes a locking pin 11 protruded on a top thereof, an end of the locking pin 11 is connected to the base plate 1 and used as a positioning part 111, and the other end of the locking pin is used as a pivot part 112. The pad body 2 is mainly used to provide a user to comfortably place and lean hand thereon, and the pad body 2 is disposed on a top of the chair armrest 10 and abutted with a top of the base plate 1, and the pad body 2 includes a receiving portion 21 disposed in the inside thereof, and a sliding hole 22 cut therethrough a bottom of the receiving portion 21, and a through hole 23 cut therethrough a lateral side of the receiving portion 21. The locking pin 11 of the base plate 1 is inserted through the sliding hole 22 and located inside the receiving portion 21. The slide control assembly 3 is mounted in the receiving portion 21 and used to drive and control the pad body 2 to move relative to the chair armrest about the locking pin 11, and the slide control assembly 3 includes a press control member 31, a longitudinally-slidable plate 32, a horizontal sliding shaft set 33, two restraining teeth plates 34, and a bottom base plate 35. A face of the longitudinally-slidable plate 32 is attached with a bottom of the receiving portion 21, and the longitudinally-slidable plate 32 has a slider 321 protruded thereon and corresponding in position to the sliding hole 22, the slider 321 has a long elliptic longitudinal hole 322 cut therethrough and disposed correspondingly in position to the locking pin 11, the slider 321 is movable in the sliding hole 22, and the locking pin 11 is movable along the longitudinal hole 322 in a hole direction, and a movement direction of the locking pin 11 is different from a movement direction of the slider 321 in the sliding hole 22; furthermore, the longitudinally-slidable plate 32 includes a plurality of engaging frames 323 disposed on two ends of other face thereof and arranged in interval, and a surrounding wall 324 surrounding and framing around the plurality of engaging frames 323.

Furthermore, two ends of the bottom base plate 35 are engaged with the plurality of engaging frames 323, respectively, the bottom base plate 35 has a lateral hole 351 located correspondingly in position to the longitudinal hole 322, the lateral hole 351 is in communication with the longitudinal hole 322 and the sliding hole 22, a face of an end of the bottom base plate 35 is engaged with the press control member 31, and the bottom base plate has a plurality of elastic pins 352 protruded on other end thereof, an end of each of the plurality of elastic pins 352 is connected to the bottom base plate 35, and other end of each of plurality of elastic pins 352 is elastically abutted against an inner wall of the receiving portion 21. An end of the press control member 31 is engaged with the bottom base plate 35, and other end of the press control member 31 is inserted out of the through hole 23. Two restraining teeth plates 34 are sandwiched between the bottom base plate 35 and the longitudinally-slidable plate 32, respectively, and the two restraining teeth plates 34 are disposed on the two sides of the longitudinal hole 322, respectively, and each of the two restraining teeth plates 34 has a protrusion 341 protruded thereon and corresponding to a side of the bottom base plate 35. The bottom base plate 35 has two tracks 353 cut therethrough and corresponding in position to the protrusions 341 of the two restraining teeth plates 34, respectively, and the two tracks 353 are downwardly extended from the end, where the plurality of elastic pins 352 are disposed, of the bottom base plate 35 and then extended to two opposite sides of the bottom base plate 35, respectively, so that the two restraining teeth plates 34 can be moved close to or away from each other by the protrusions 341 moving along the two tracks 353. Each of the two restraining teeth plates 34 has a teeth part 342 disposed on a side thereof corresponding to the other of the two restraining teeth plates 34, and each of the two restraining teeth plates 34 has an elastic member 343 extended from an end thereof opposite to the teeth part 342, and each of the elastic members 343 has an end connected to the restraining teeth plate 34, and other end elastically abutted with the surrounding wall 324. The horizontal sliding shaft set 33 is mounted on the locking pin 11, and disposed between the two restraining teeth plates 34 and in the lateral hole 351. The horizontal sliding shaft set 33 further includes a main body 331 and a teeth disk member 332, the main body 331 has a curved groove 333 recessed thereon and a lateral teeth row 334 disposed on a side thereof and engaged with the teeth part 342 of one of the two restraining teeth plates 34, the teeth disk member 332 is assembled with the curved groove 333 of the main body 331 and pivotally swingable relative to the curved groove 333, and the teeth disk member 332 has a shaft hole 335 cut therethrough, and a hole shape of the shaft hole 335 corresponds to that of the positioning part 111 and the pivot part 112, so that the shaft hole 335 can fit the positioning part 111 and the pivot part 112; the teeth disk member 332 is pivotally swingable relative to the main body 331, and has an arc teeth-row 336 disposed on a side thereof and engaged with the teeth part 342 of the other of the two restraining teeth plates 34, so that when the press control member 31 is pressed, engagements between the two restraining teeth plates 34 and the horizontal sliding shaft set 33 can be released, and the pad body 2 is adjustable to move longitudinally and laterally and rotate about the chair armrest 10 based on cooperation between the longitudinal hole 322 and the horizontal sliding shaft set 33, cooperation between the slider 321 of the longitudinally-slidable plate 32 and the sliding hole 22, and pivot cooperation between the main body 331 and the teeth disk member 332.

Please refer to FIGS. 6 to 13. An X axis 20, a Y axis 30 and a Z-axis 40 are defined based on the chair armrest 10 serving as an axle center, the chair armrest 10 is positioned on the Z-axis 40, and the pad body 2 is positioned on the horizontal plane formed by the X axis and the Y axis 30. When a user wants to adjust a position of the pad body 2 relative to the chair armrest 10 to lean or place a hand on the pad body 2 more comfortably, the user just needs to press the press control member 31 toward the receiving portion 21, the press control member 31 can drive the bottom base plate 35 to move in a direction where the press control member 31 is pressed, and the two tracks 353 on the bottom base plate 35 are cooperating with the protrusions 341 of the restraining teeth plate 34 at the same time, so that each restraining teeth plate 34 can be moved toward the end, where the elastic member 343 are disposed, thereof, and at this time, thereby releasing engagements between the teeth part 342 of the restraining teeth plate 34 and the arc teeth-row 336 of the teeth disk member 332, and between the teeth part 342 of the restraining teeth plate 34 and the lateral teeth row 334 of the main body 331. After the above-mentioned engagements are released, the pad body 2 can be adjusted to move along the Y axis 30 in a longitudinal direction based on cooperation between the horizontal sliding shaft set 33 and the locking pin 11. During the movement, the pad body 2 can be controlled to move along the Y axis 30 by a push manner in the longitudinal direction because the horizontal sliding shaft set 33 is assembled with the locking pin 11 and the area of the longitudinally-slidable plate 32 is smaller than an area of the bottom face of the receiving portion 21. As shown in the continuous operations shown in FIGS. 13 to 15, the position of the slider 321 in the sliding hole 22 is changed during movement of the pad body 2.

Figure 16:
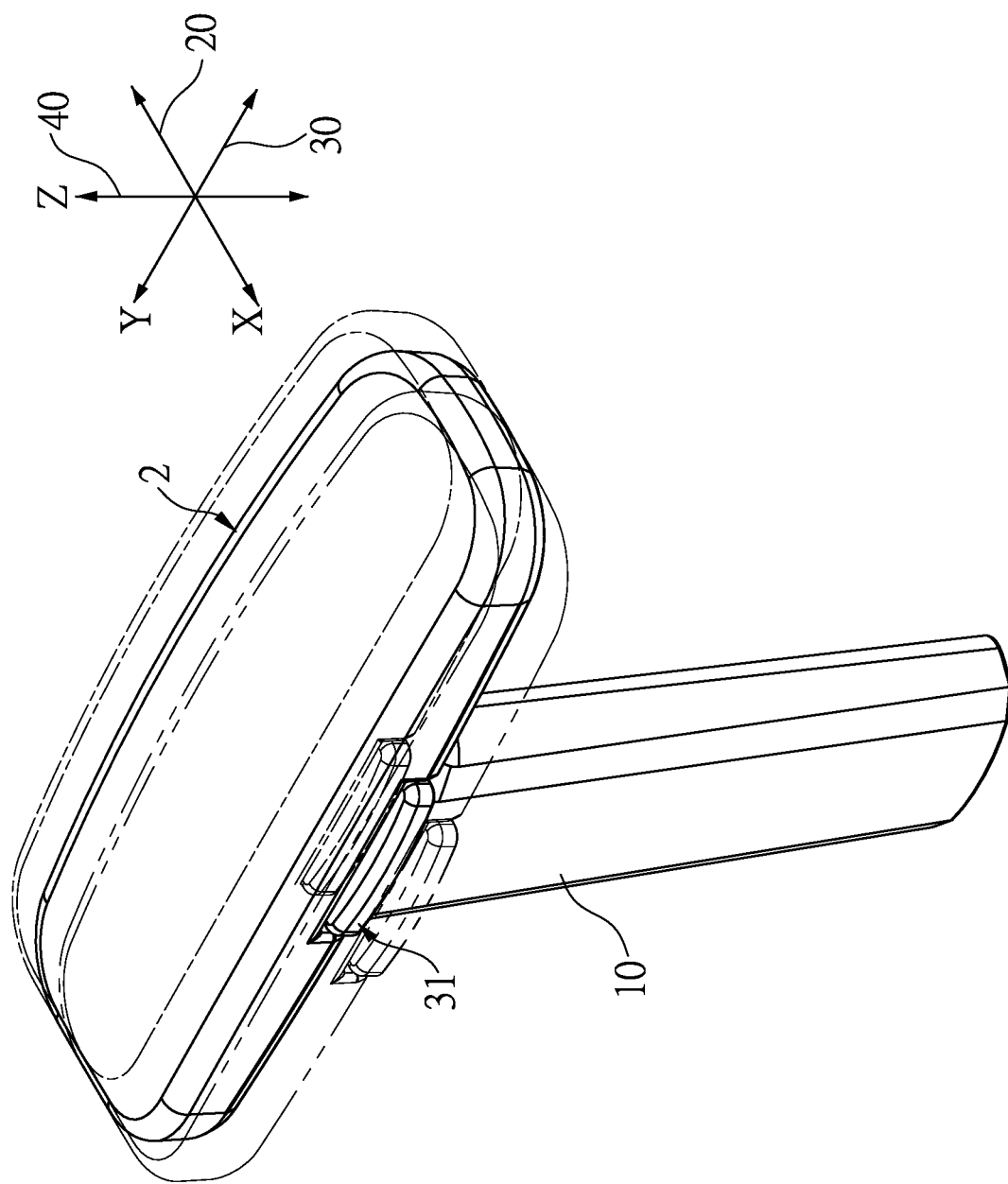
FIG. 16 is a schematic view showing lateral movement of the pad body of the present invention.
Figure 17:
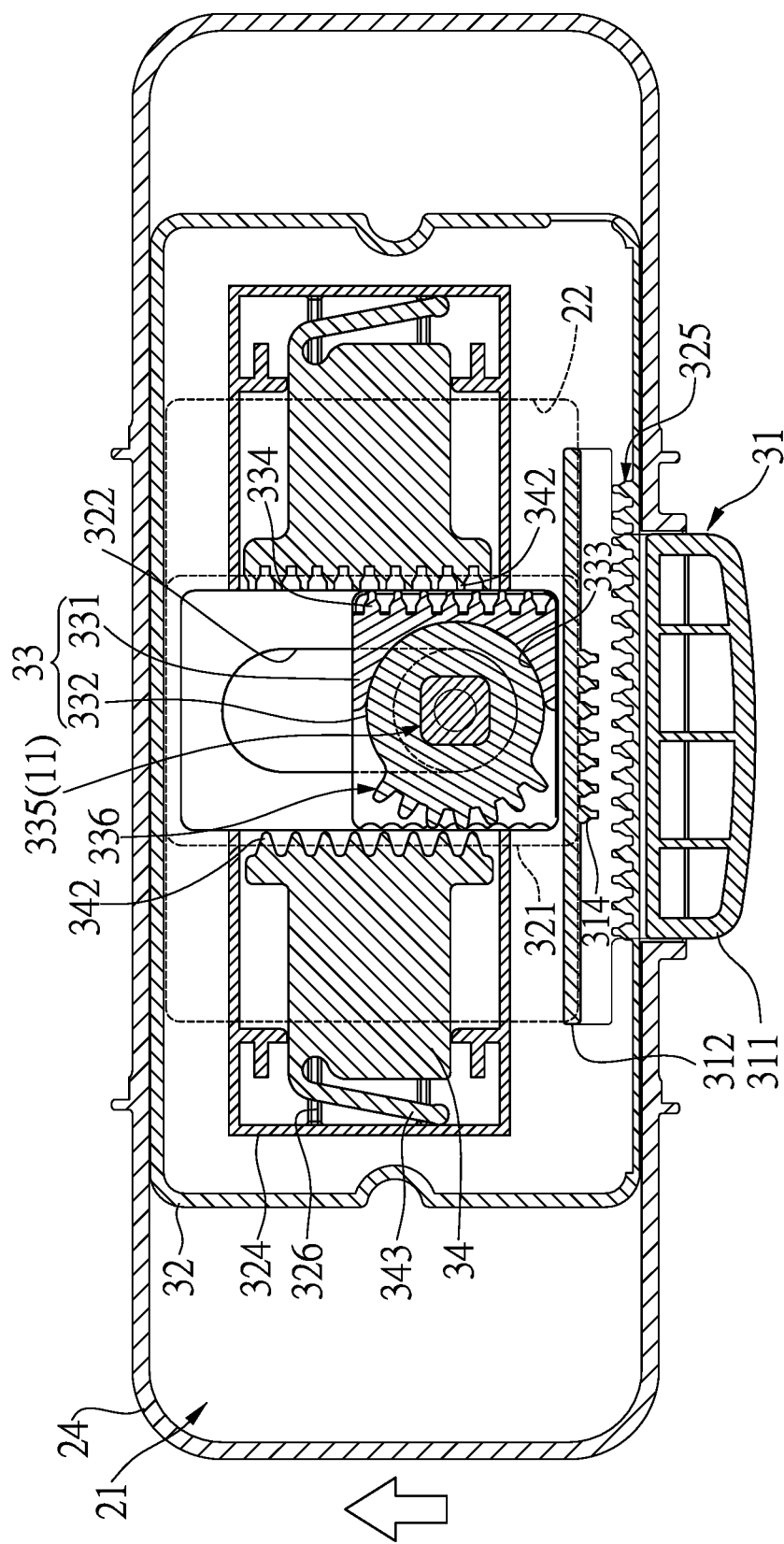
FIG. 17 is schematic view showing an operation of moving a pad body, a longitudinally-slidable plate of a slide control assembly, two restraining teeth plates and a bottom base plate about a horizontal sliding shaft set and changing a position of the horizontal sliding shaft set to a side of a longitudinal sliding hole after a press control member is pressed.
Figure 18:
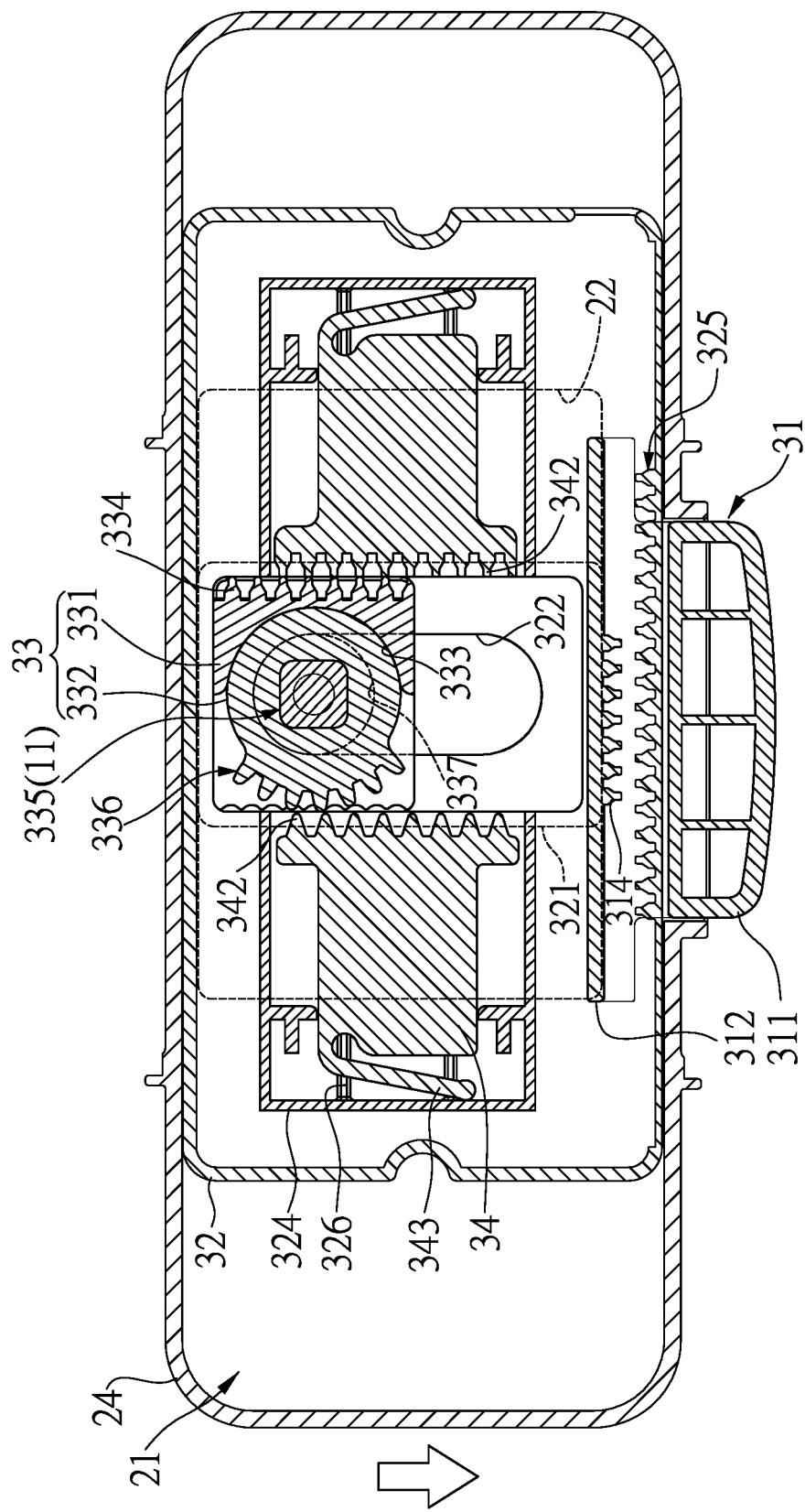
FIG. 18 is a schematic view showing an operation of moving a pad body, a longitudinally-slidable plate of a slide control assembly, two restraining teeth plates and a bottom base plate about a horizontal sliding shaft set and changing a position of the horizontal sliding shaft set to the other side of a longitudinal sliding hole after the press control member is pressed, according to the present invention.
Figure 19:
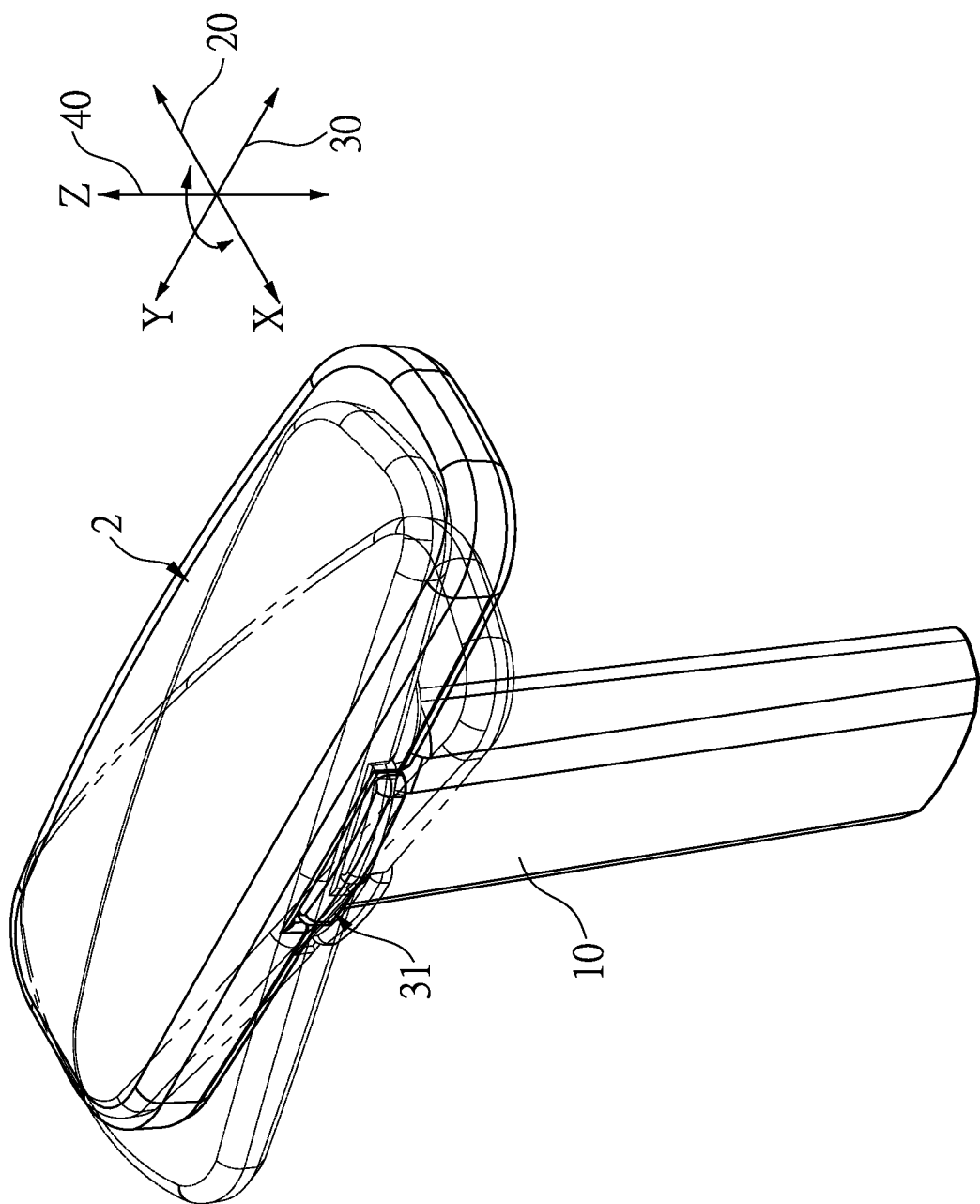
FIG. 19 is a schematic view showing a rotation of a pad body of the present invention.
Figure 20:
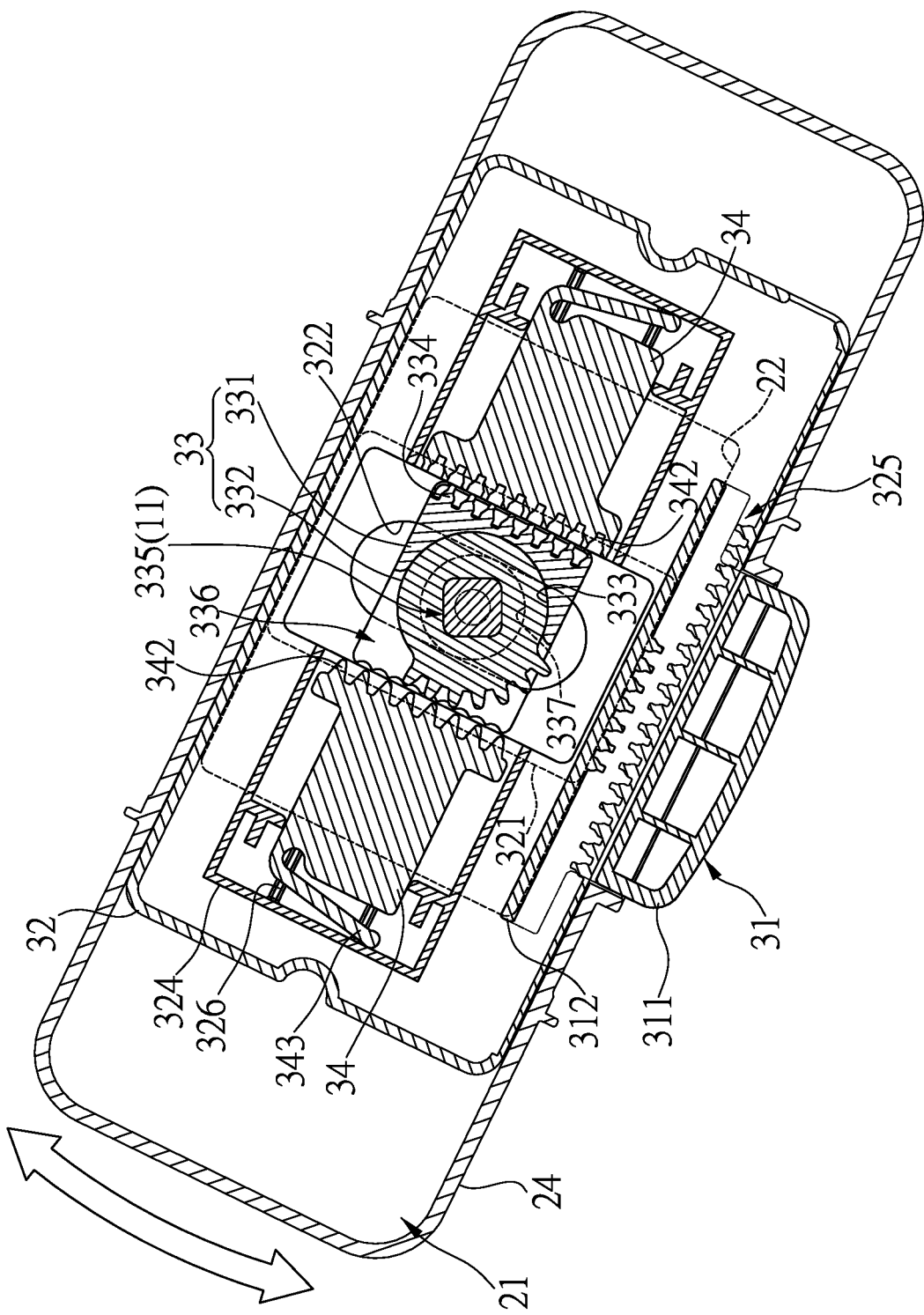
FIG. 20 is a schematic view showing an operation of simultaneously pivotally swinging members, which are other than a teeth disk member, of a slide control assembly in a direction about a teeth disk member and a locking pin as a pivot axis after the press control member is pressed, according to the present invention.
Figure 21:
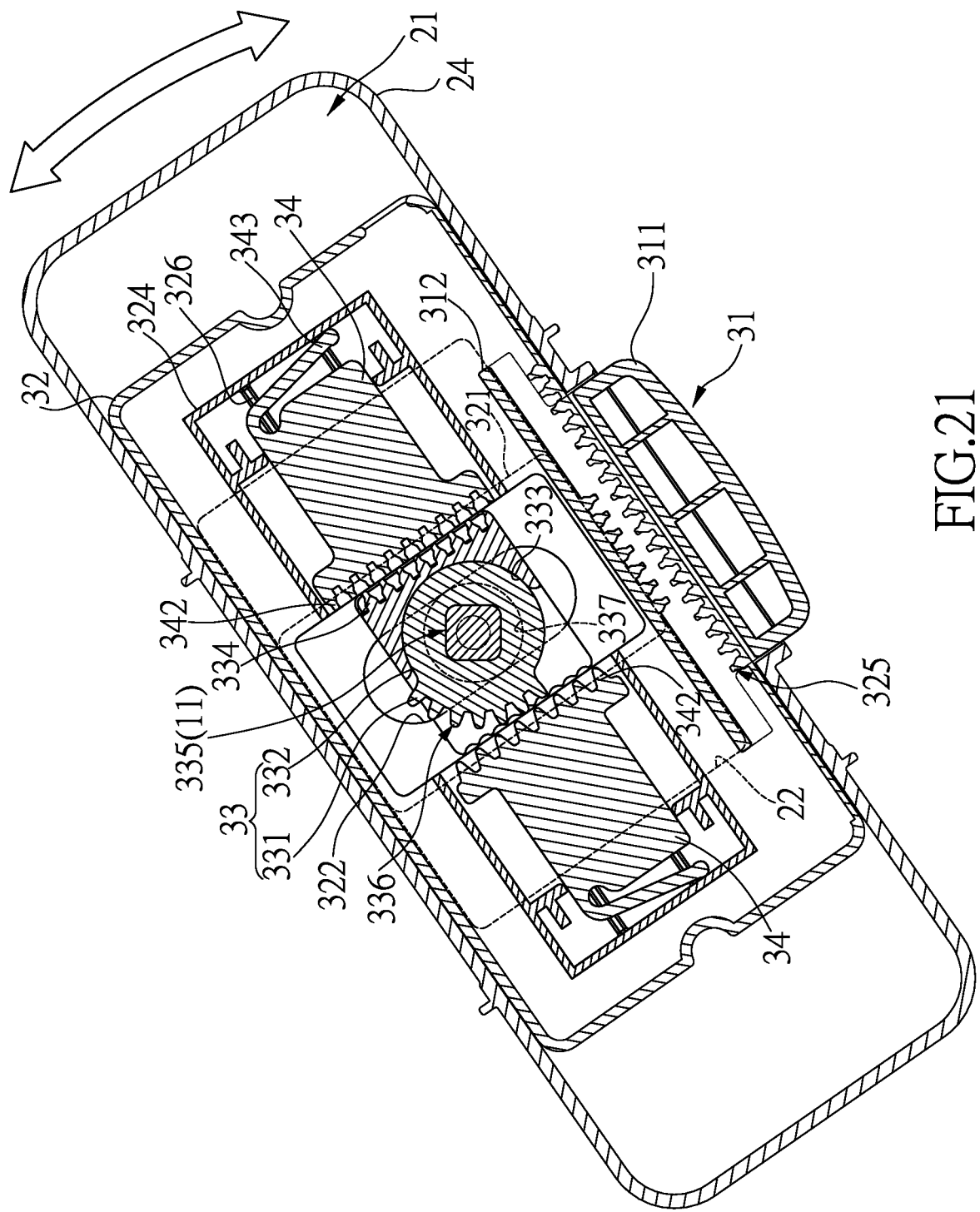
FIG. 21 is a schematic view showing an operation of simultaneously pivotally swinging members, which are other than a teeth disk member, of a slide control assembly in another direction after the press control member is pressed, according to the present invention.
Figure 22:
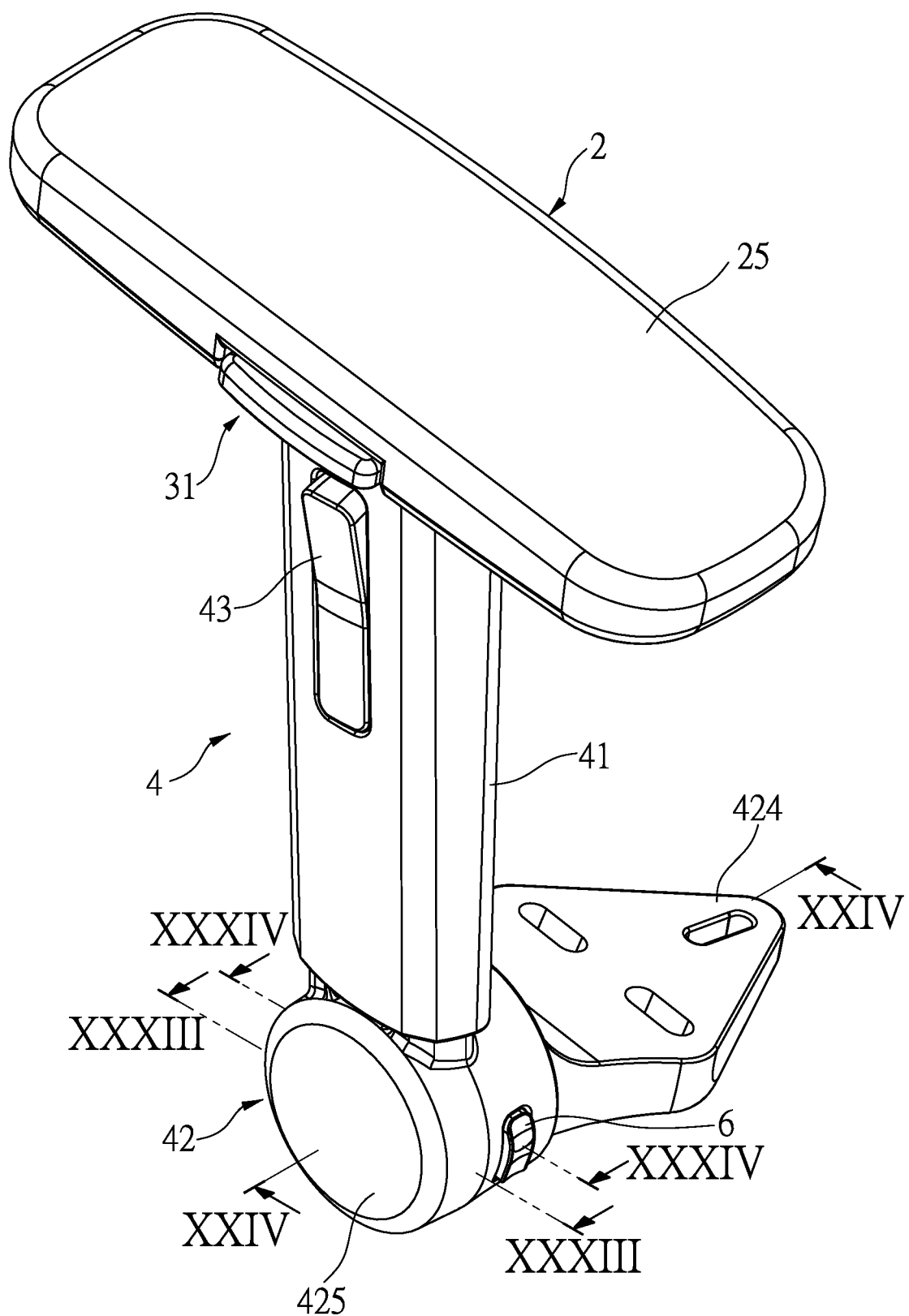
FIG. 22 is a perspective view of an assembly of a pad body and a regulating assembly of the present invention.
Figure 23:
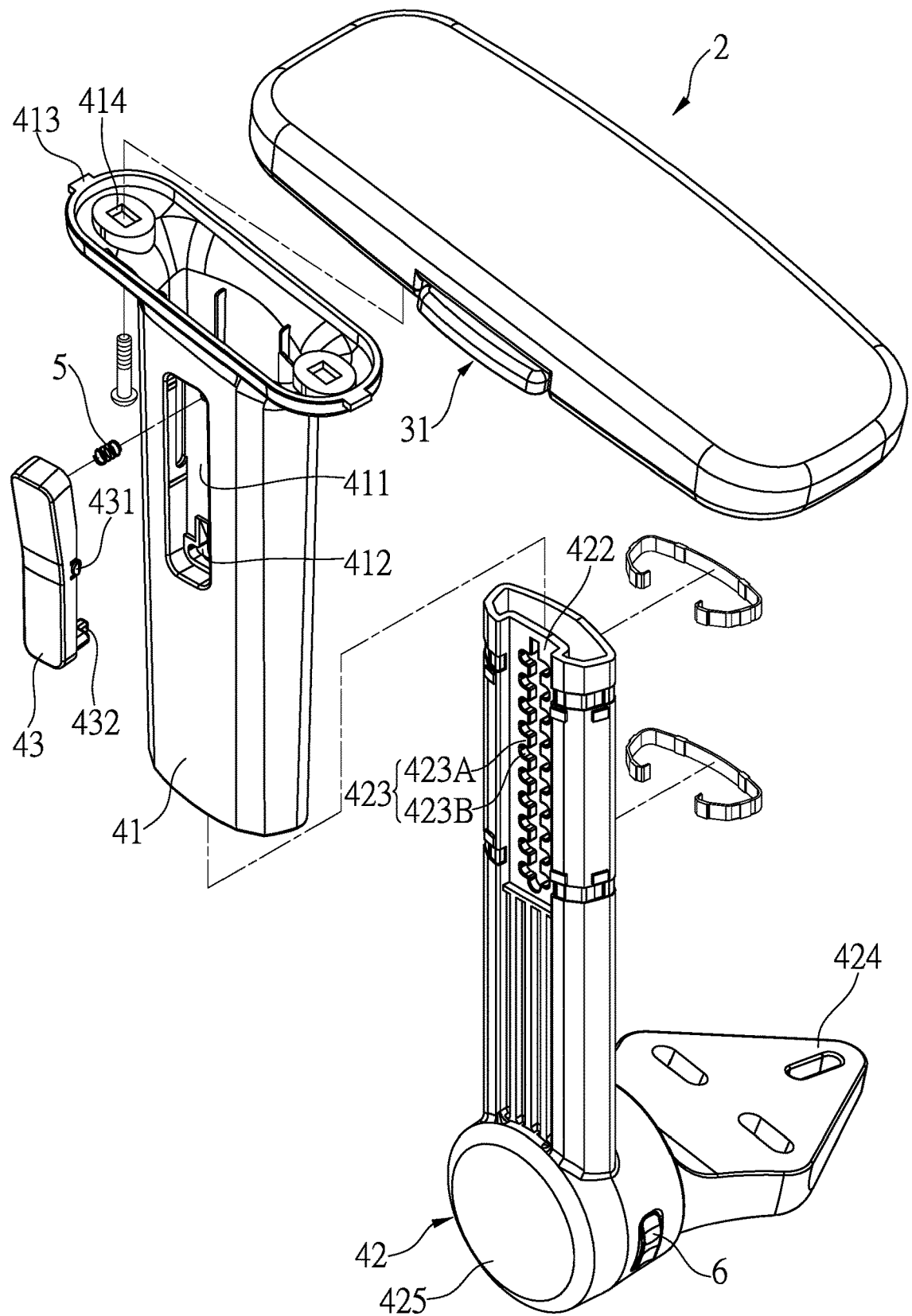
FIG. 23 is a perspective exploded view of FIG. 22.
Figure 24:
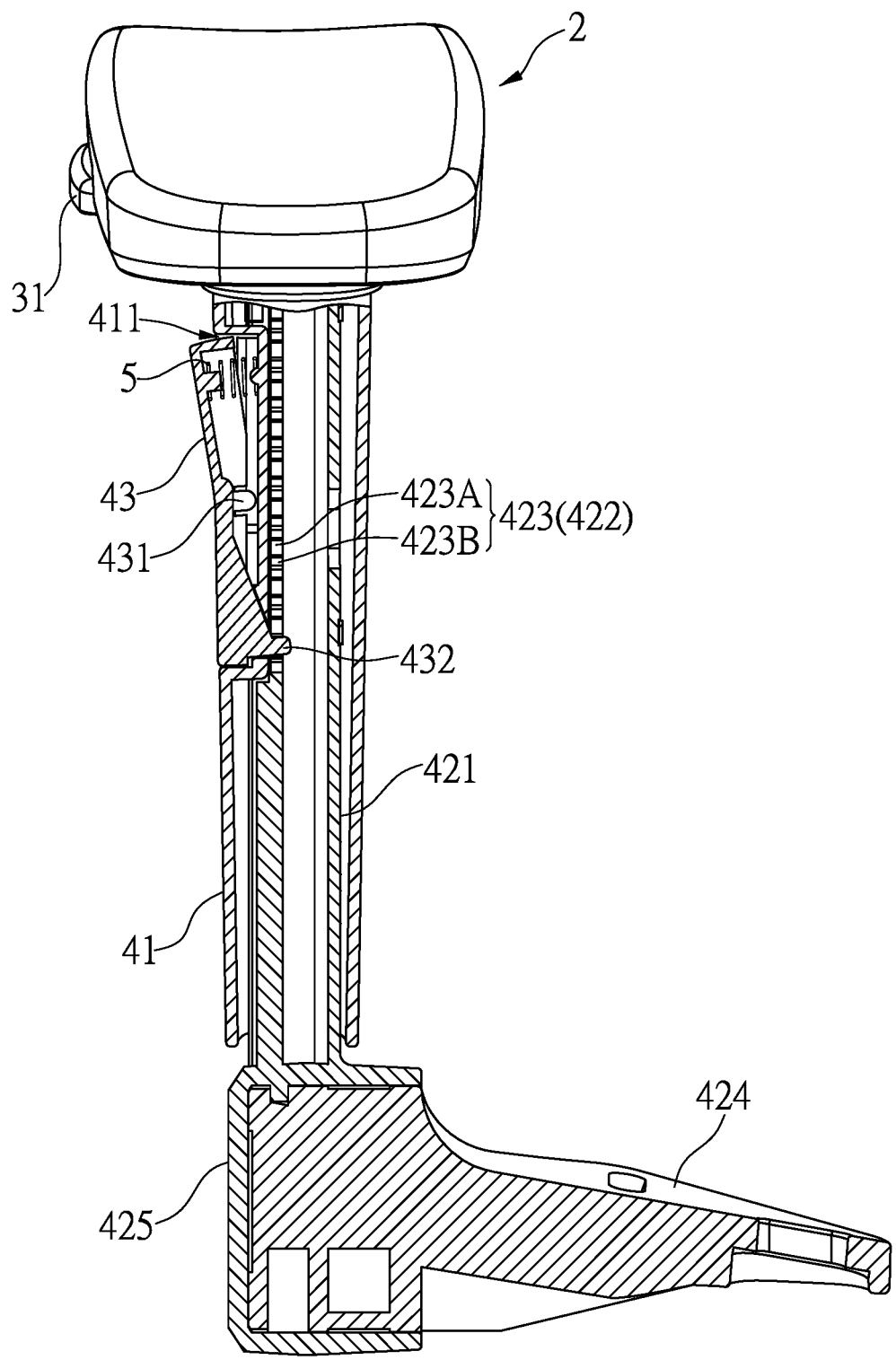
FIG. 24 is a schematic cross-sectional view taken along XXIV-XXIV of FIG. 22.
Figure 25:
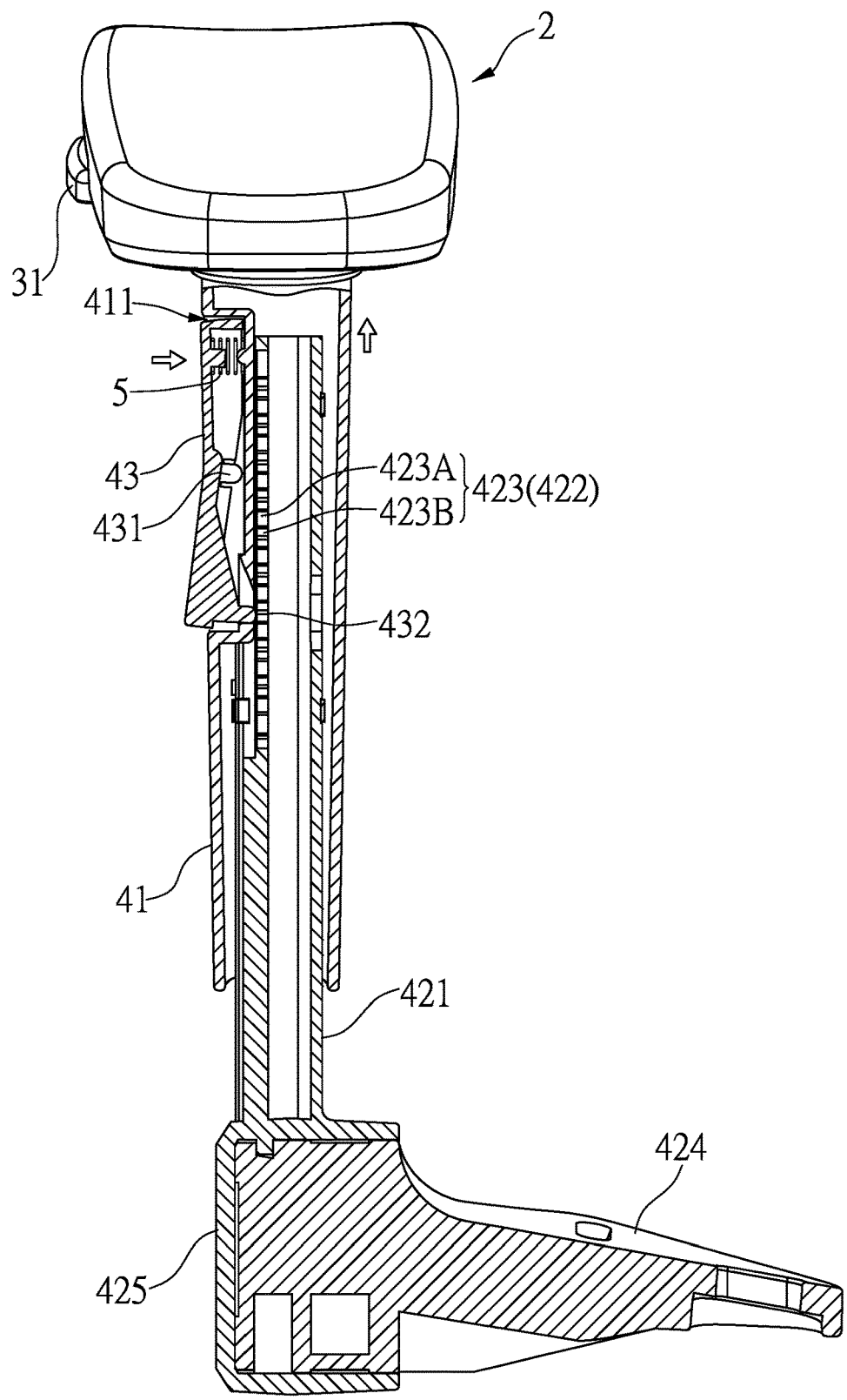
FIG. 25 is a schematic view showing an operation of pressing a control button and adjusting movement, according to FIG. 24.
Figure 26:
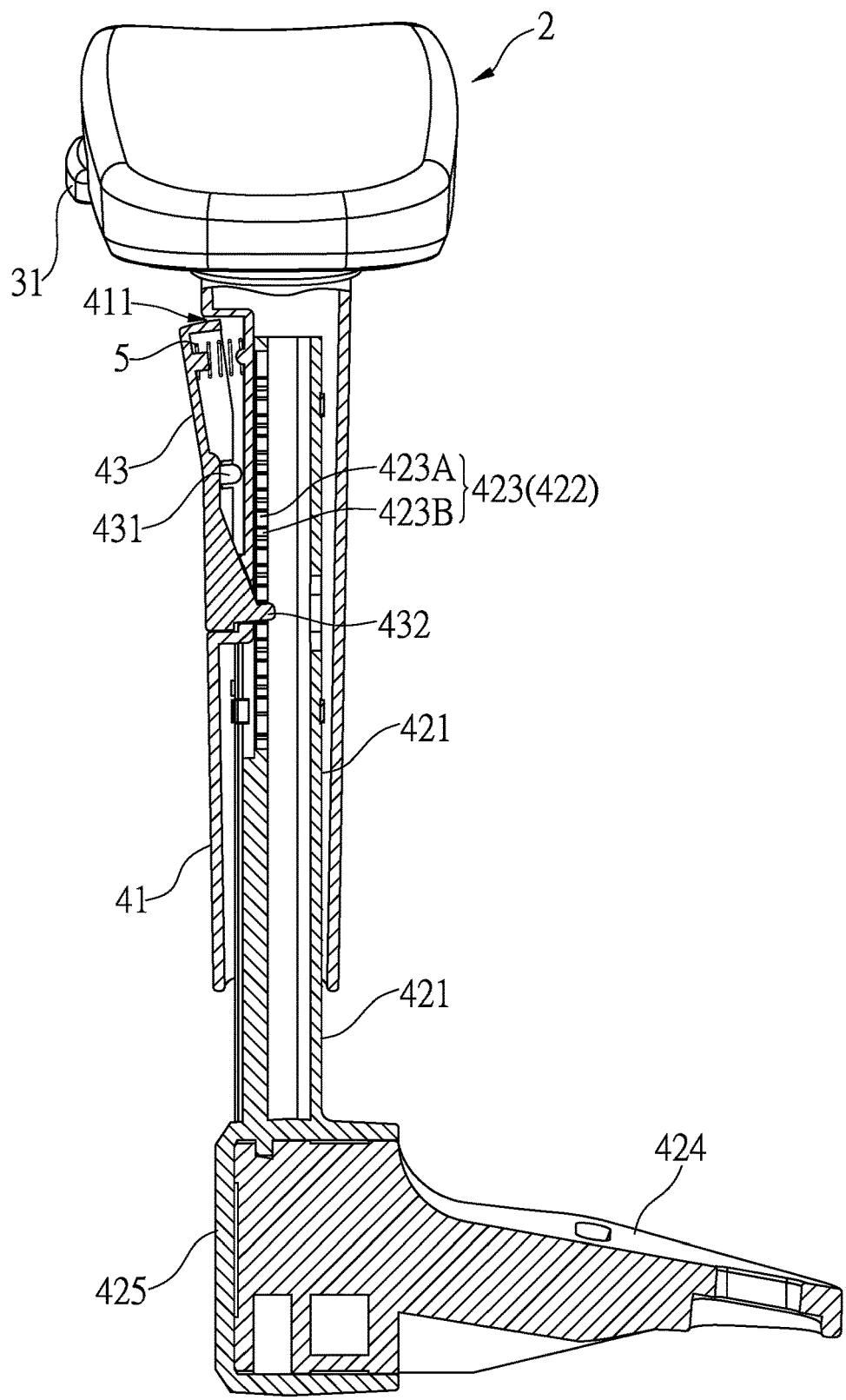
FIG. 26 is a schematic view of a chair armrest positioned after a positional adjustment is completed, according to FIG. 25.
Figure 27:
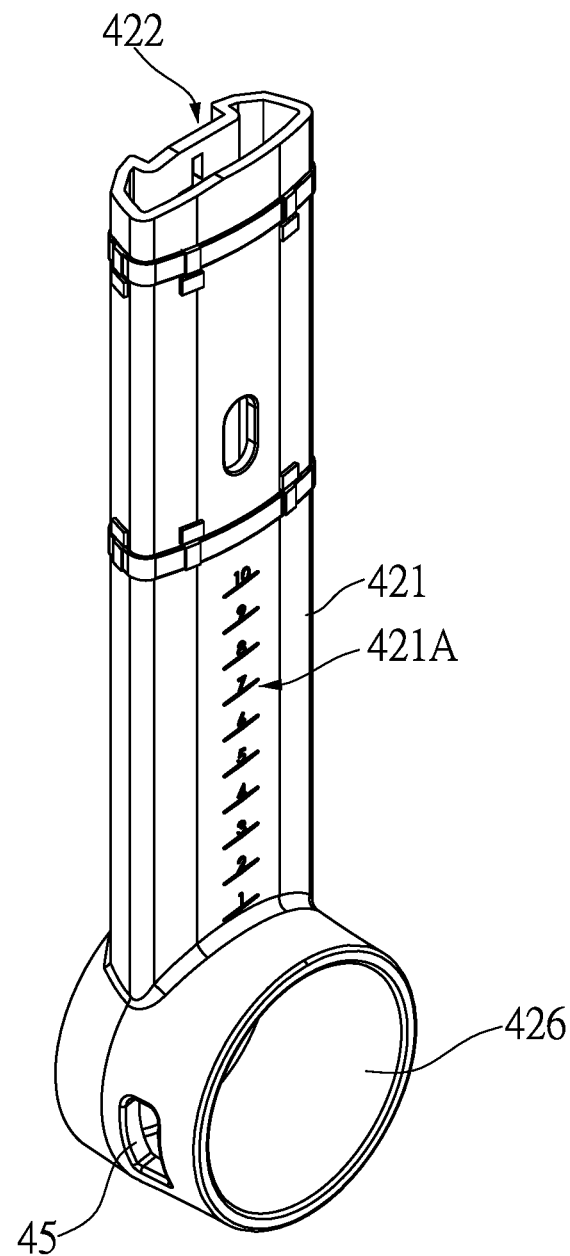
FIG. 27 is a perspective view of an inner sleeve assembly of the present invention, when viewed from another angle.
Figure 28:
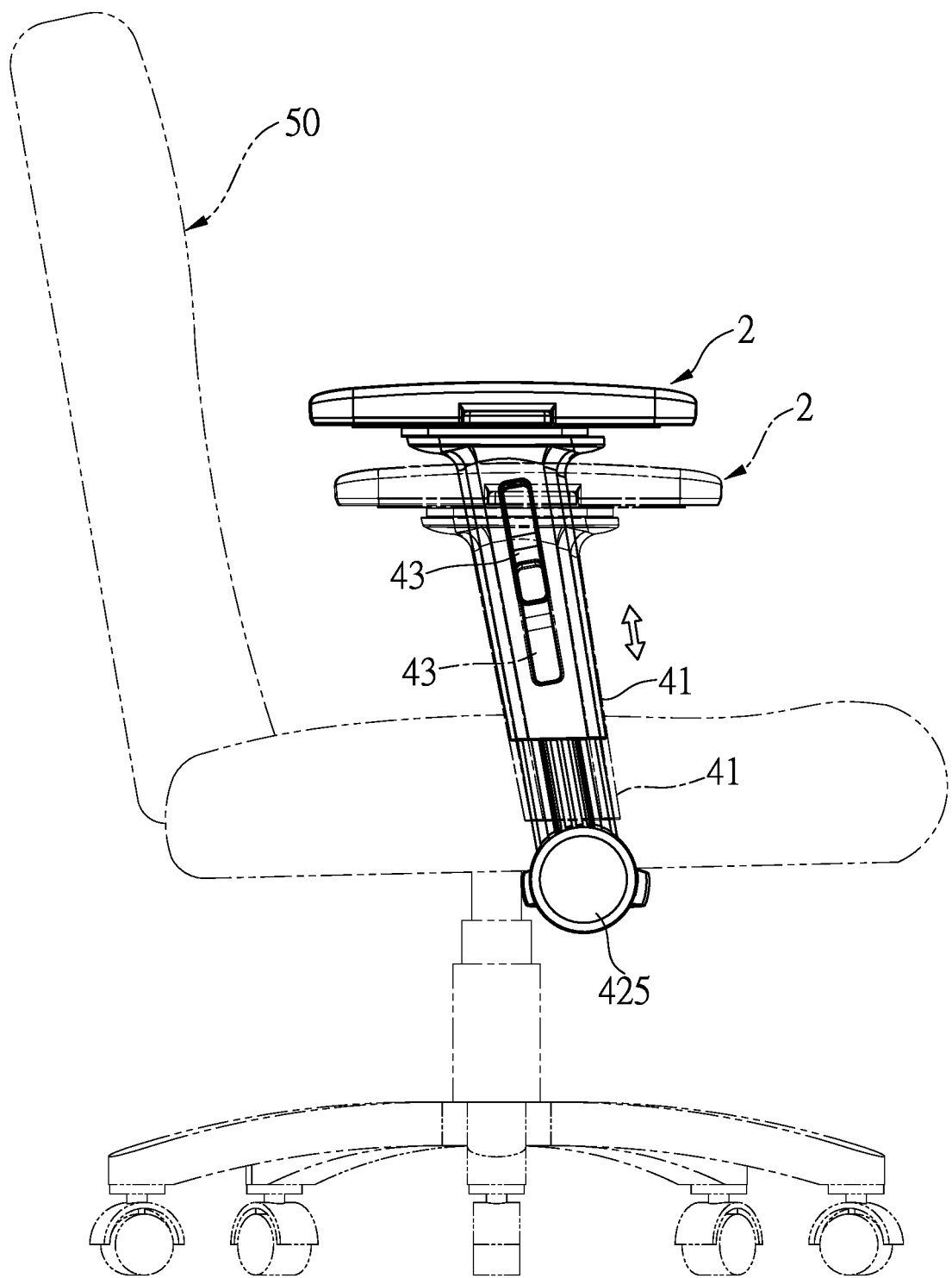
FIG. 28 is a schematic view of an operation of assembling a pad body and a regulating assembly and then mounting the assembled pad body and regulating assembly on a chair, according to the present invention.
Figure 29:
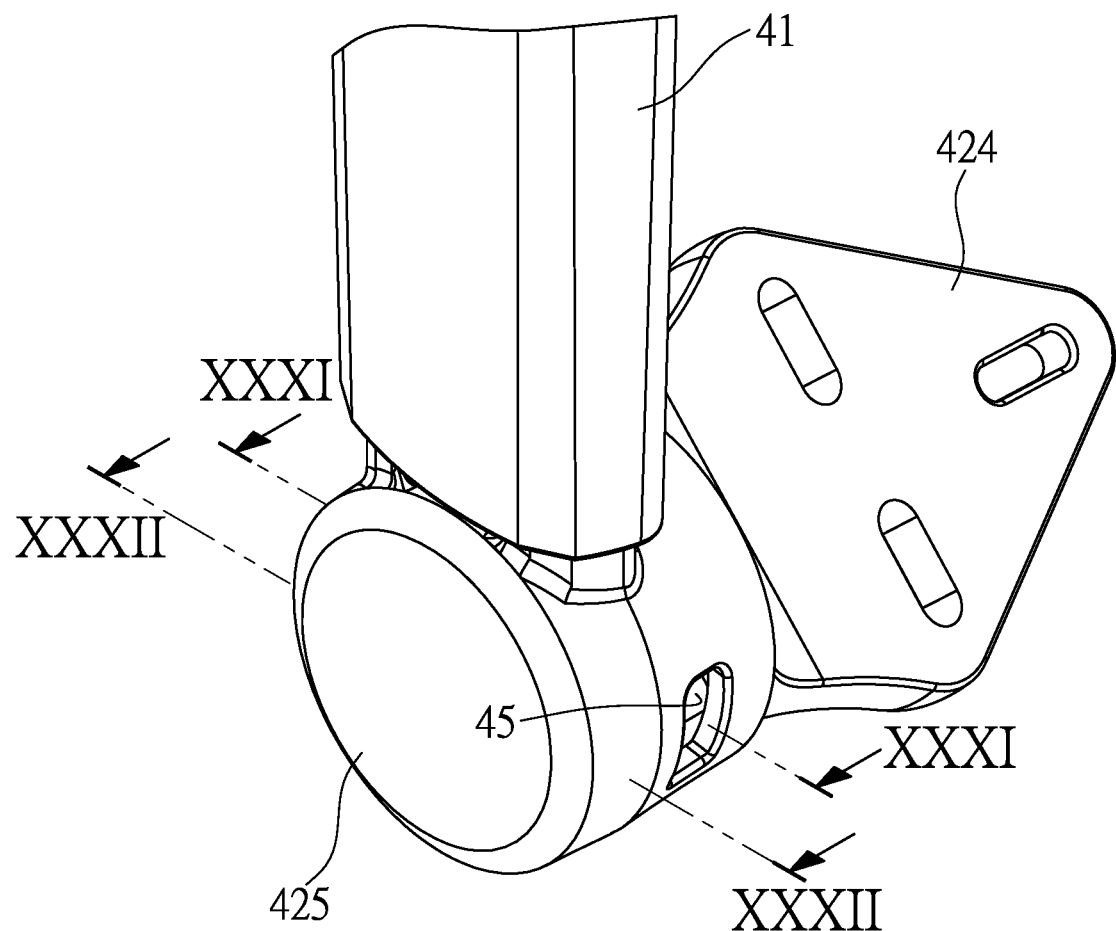
FIG. 29 is a perspective view of an inner sleeve assembly of the present invention.
Figure 30:
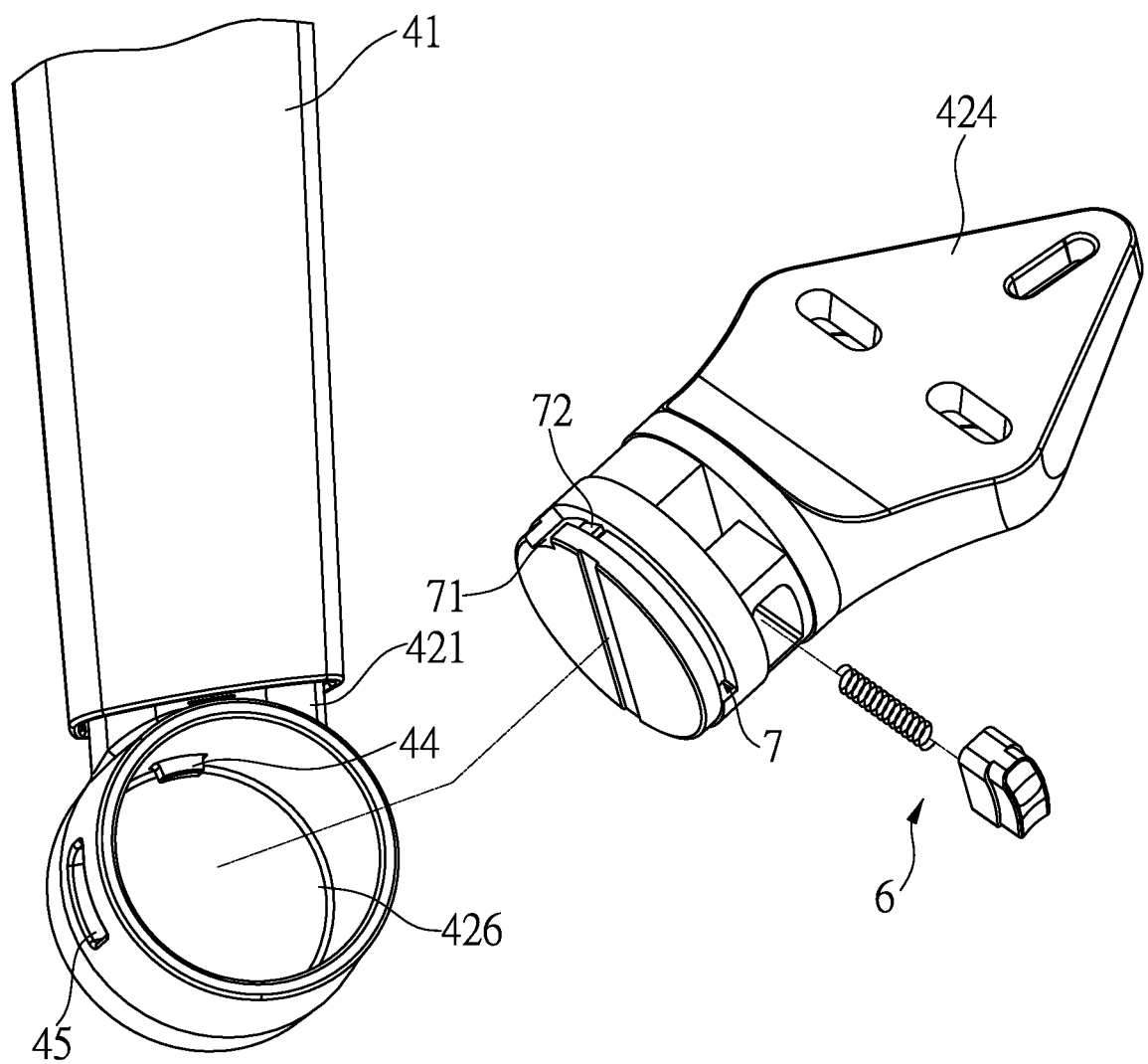
FIG. 30 is a perspective exploded view of FIG. 29.
Figure 32:
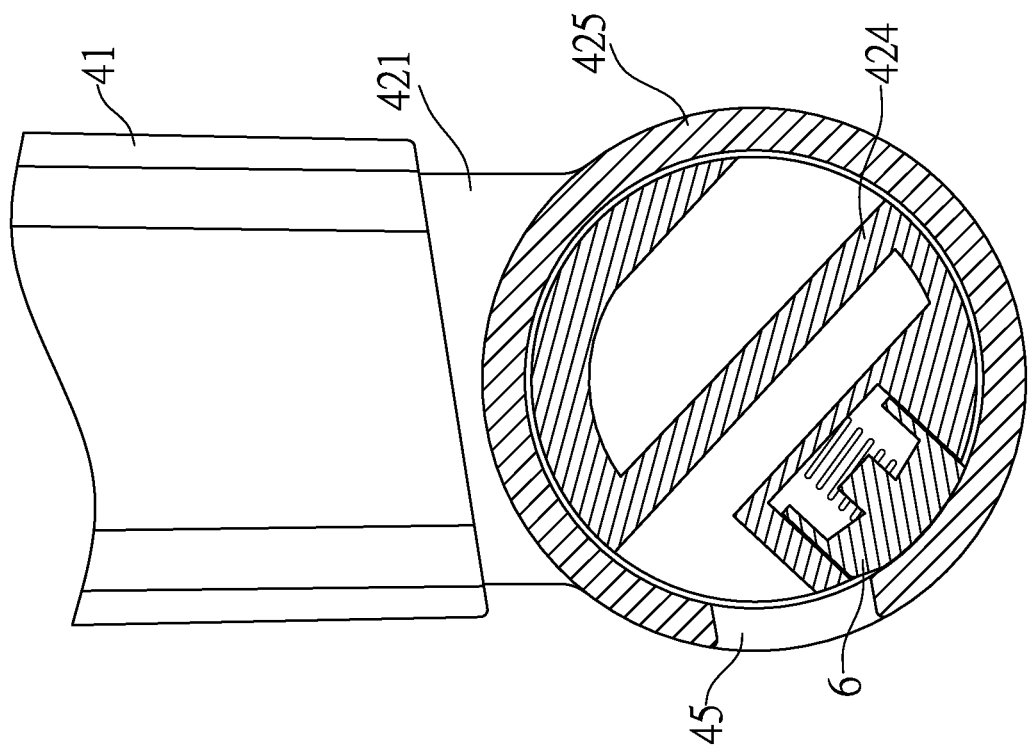
FIG. 32 is a schematic cross-sectional view taken along XXXII-XXXII of FIG. 29.
Figure 31:
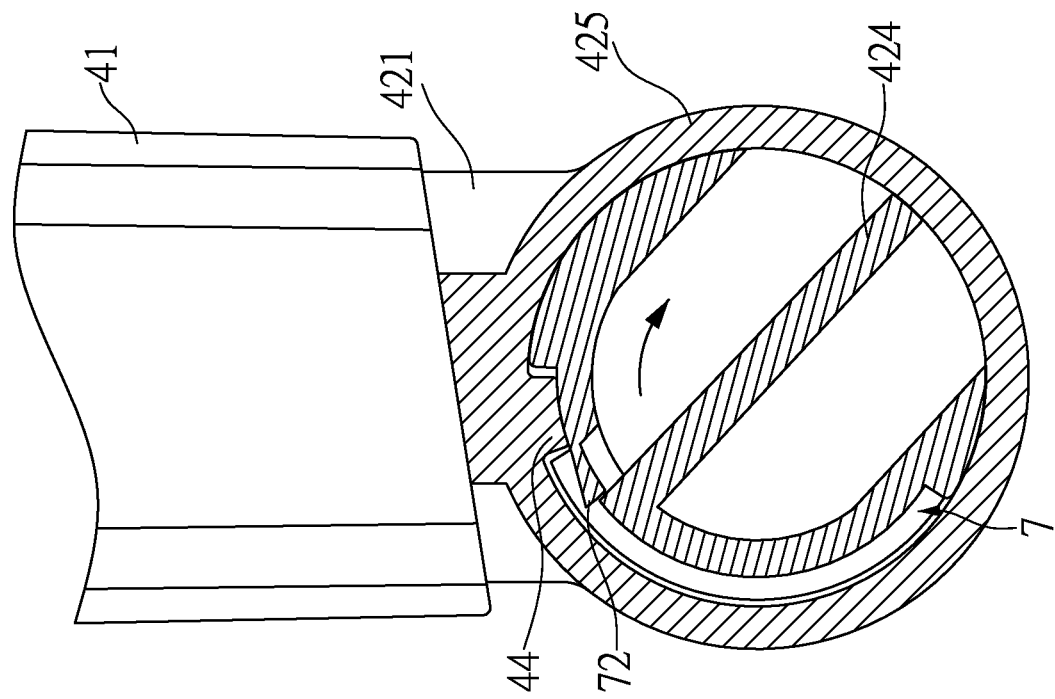
FIG. 31 is a schematic cross-sectional view taken along XXXI-XXXI of FIG. 29.
Figure 34:
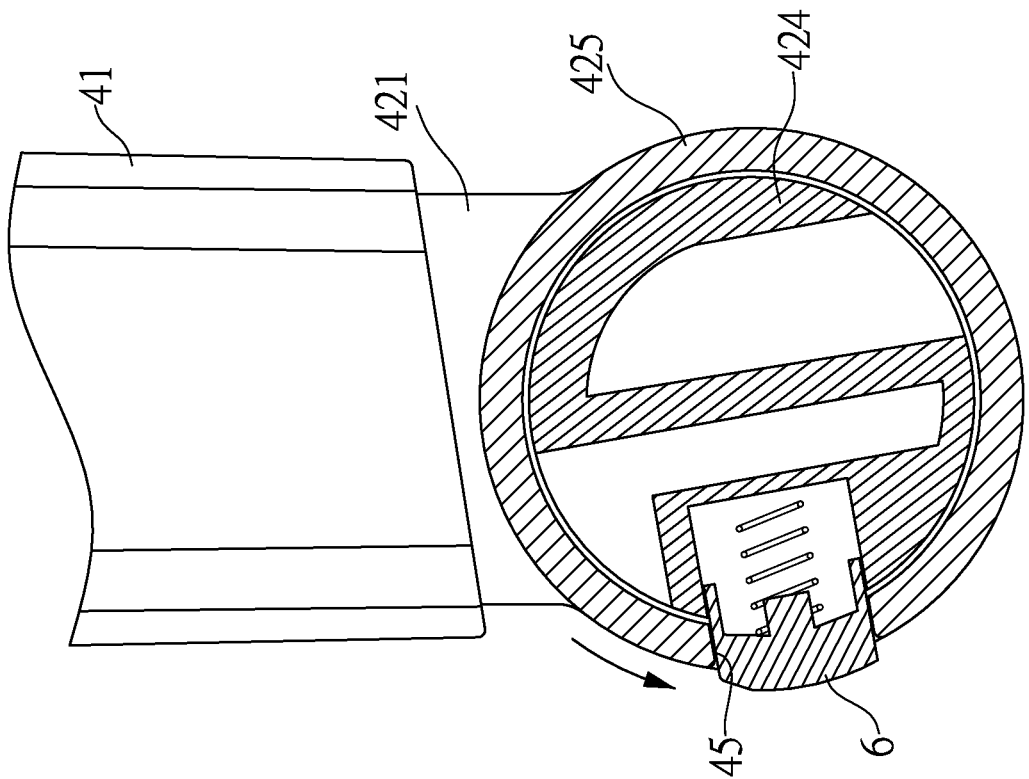
FIG. 34 is a schematic cross-sectional view taken along XXXIV-XXXIV of FIG. 22 and showing an operation of pivoting a joint member and a pivot assembly and making an elastic control button eject out of a positioning hole, according to the present invention.
Figure 33:
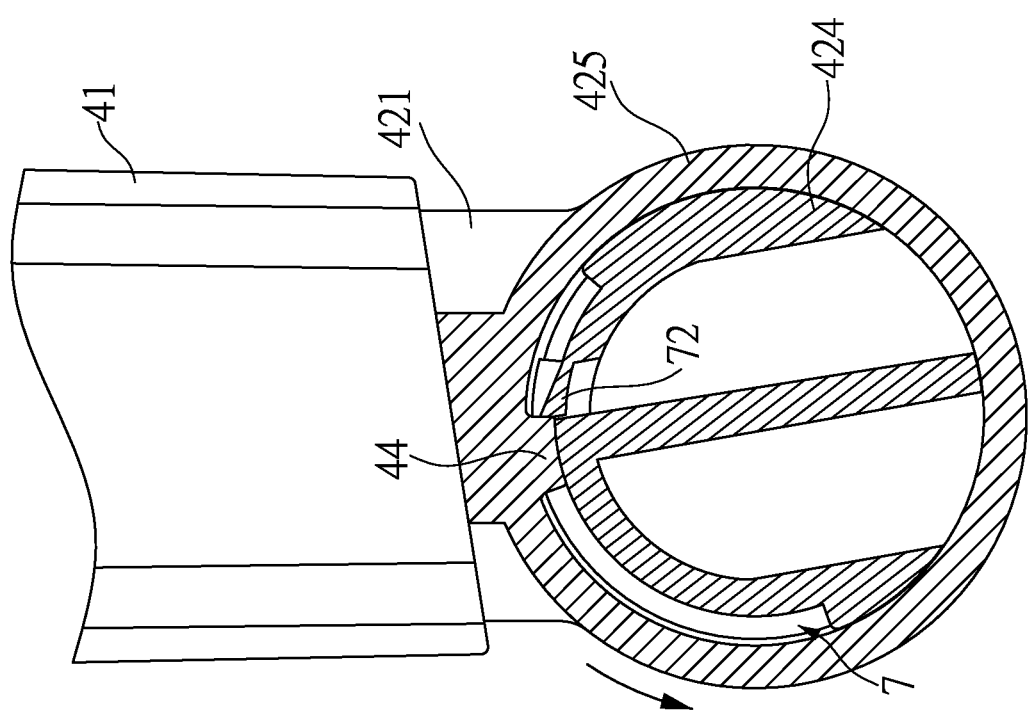
FIG. 33 is a schematic cross-sectional view taken along XXXIII-XXXIII of FIG. 22 and showing an operation of pivoting a joint member and a pivot assembly, and then sliding a slidable connection block over an elastic engaging block, according to the present invention.
Figure 35:
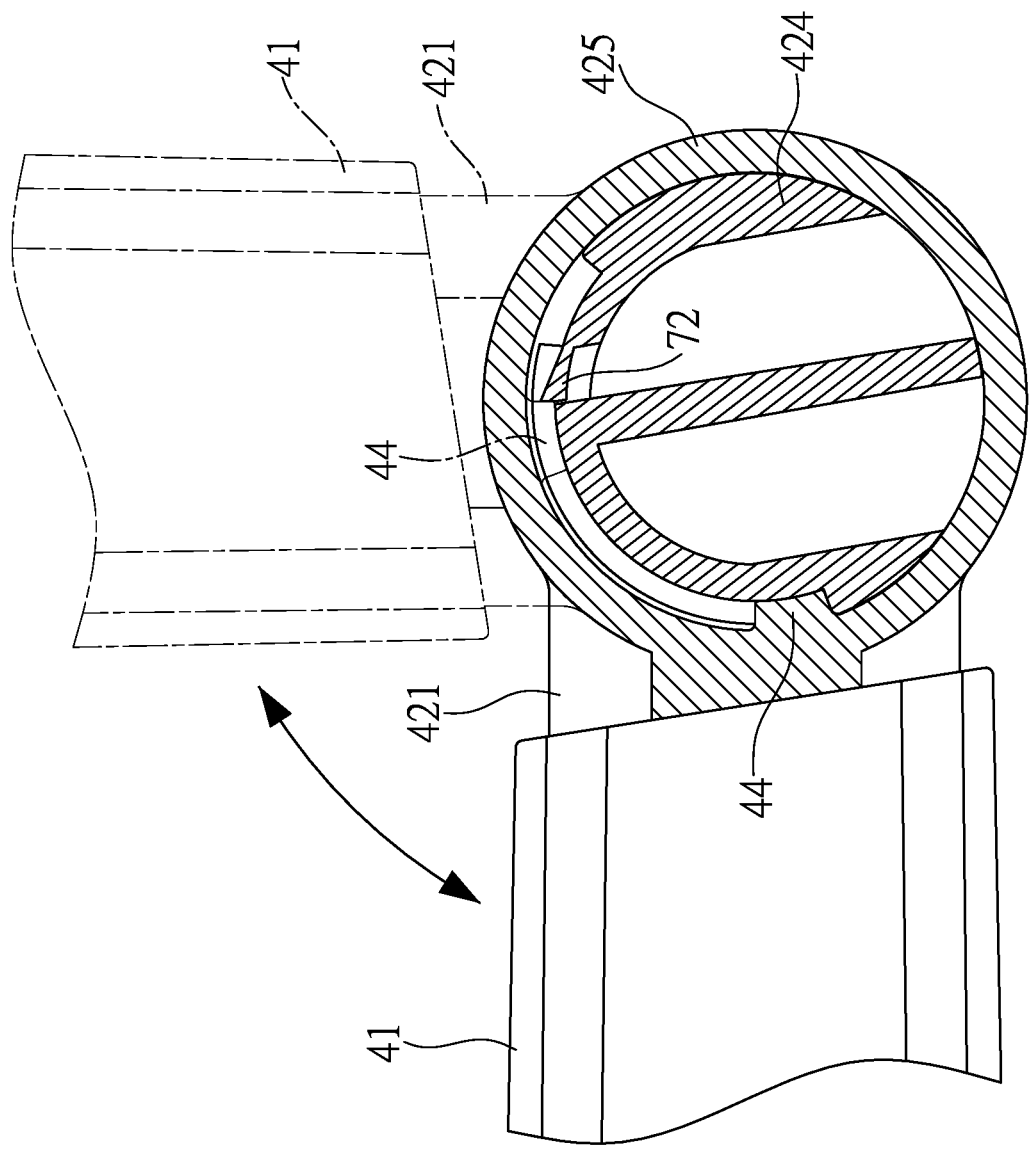
FIG. 35 is a schematic view showing a continuous operation of the joint member and the pivot assembly, according to the present invention.
Figure 36:
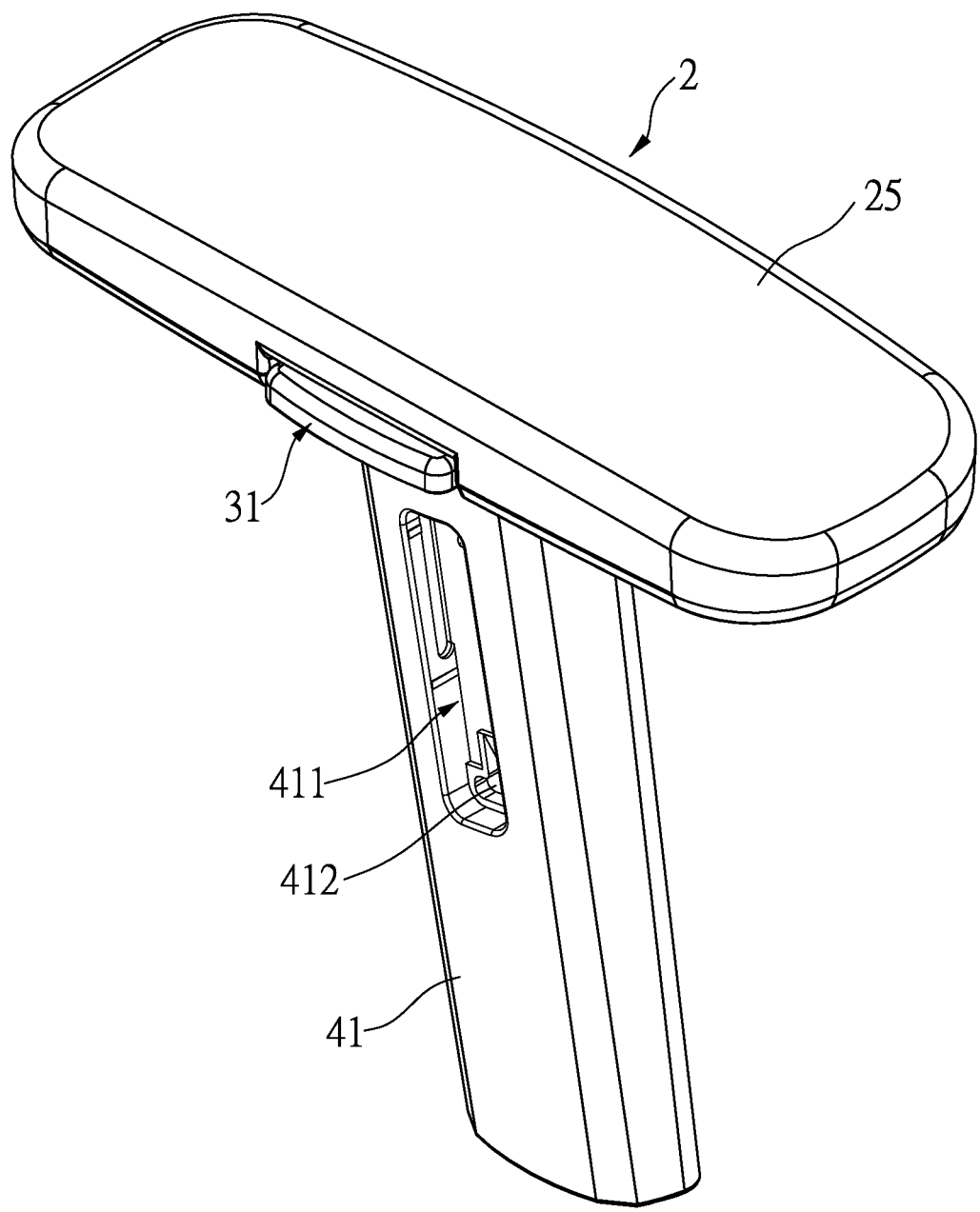
FIG. 36 is a perspective view of another embodiment of the present invention.
Figure 36A:
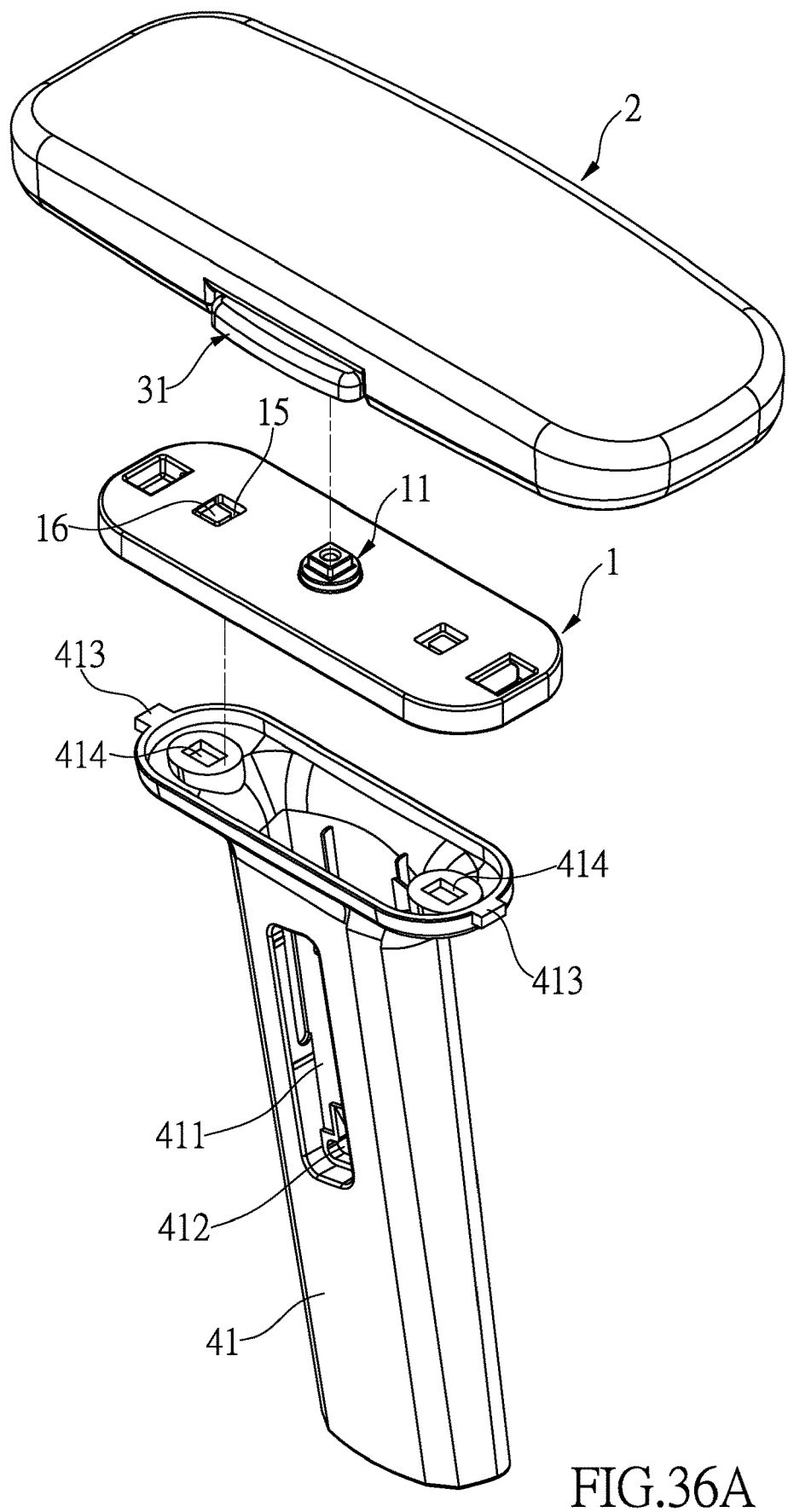
FIG. 36A is a perspective exploded view of FIG. 36.
Figure 36B:
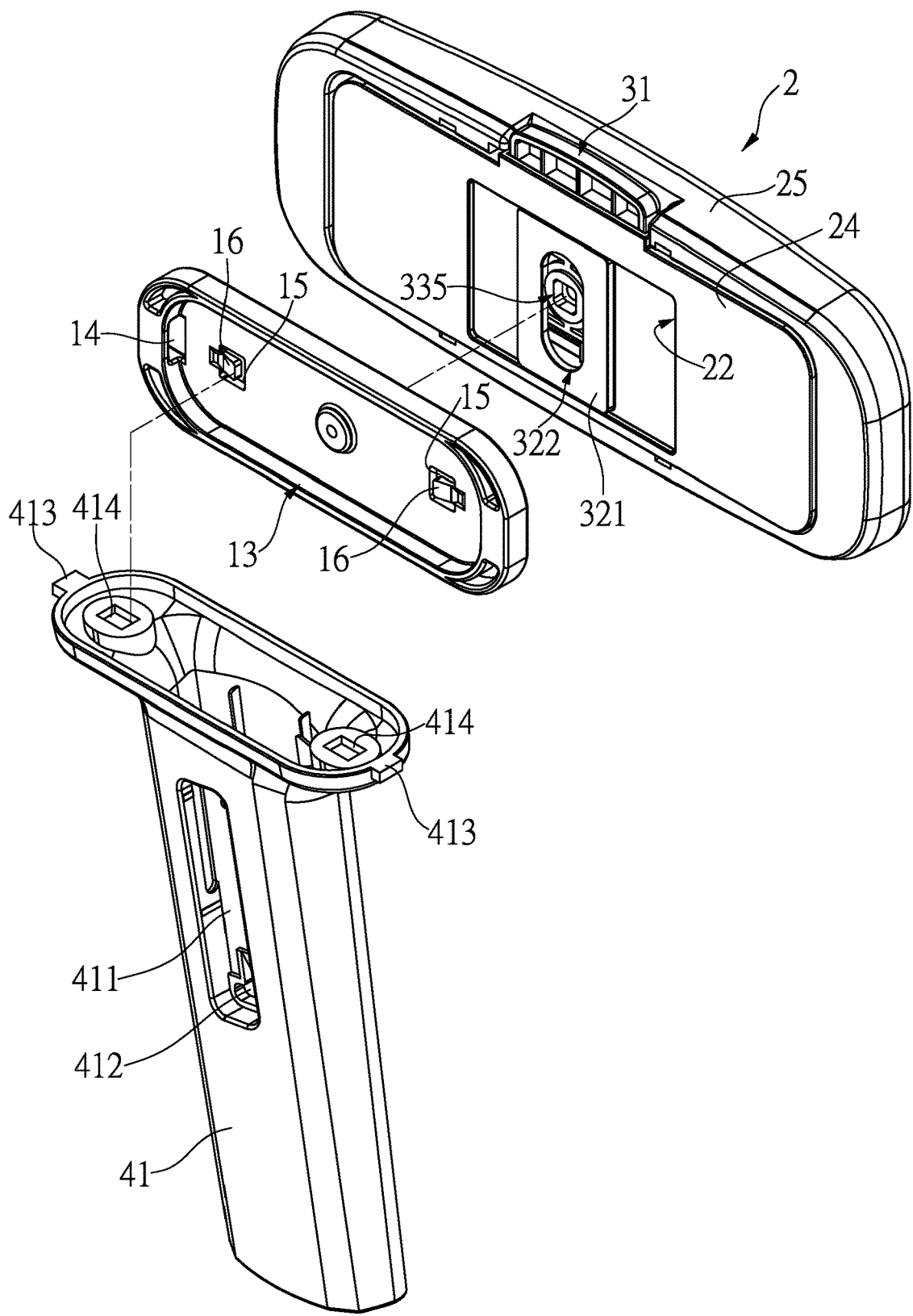
FIG. 36B is a perspective exploded view of FIG. 36A, when viewed from another angle.
Figure 37:
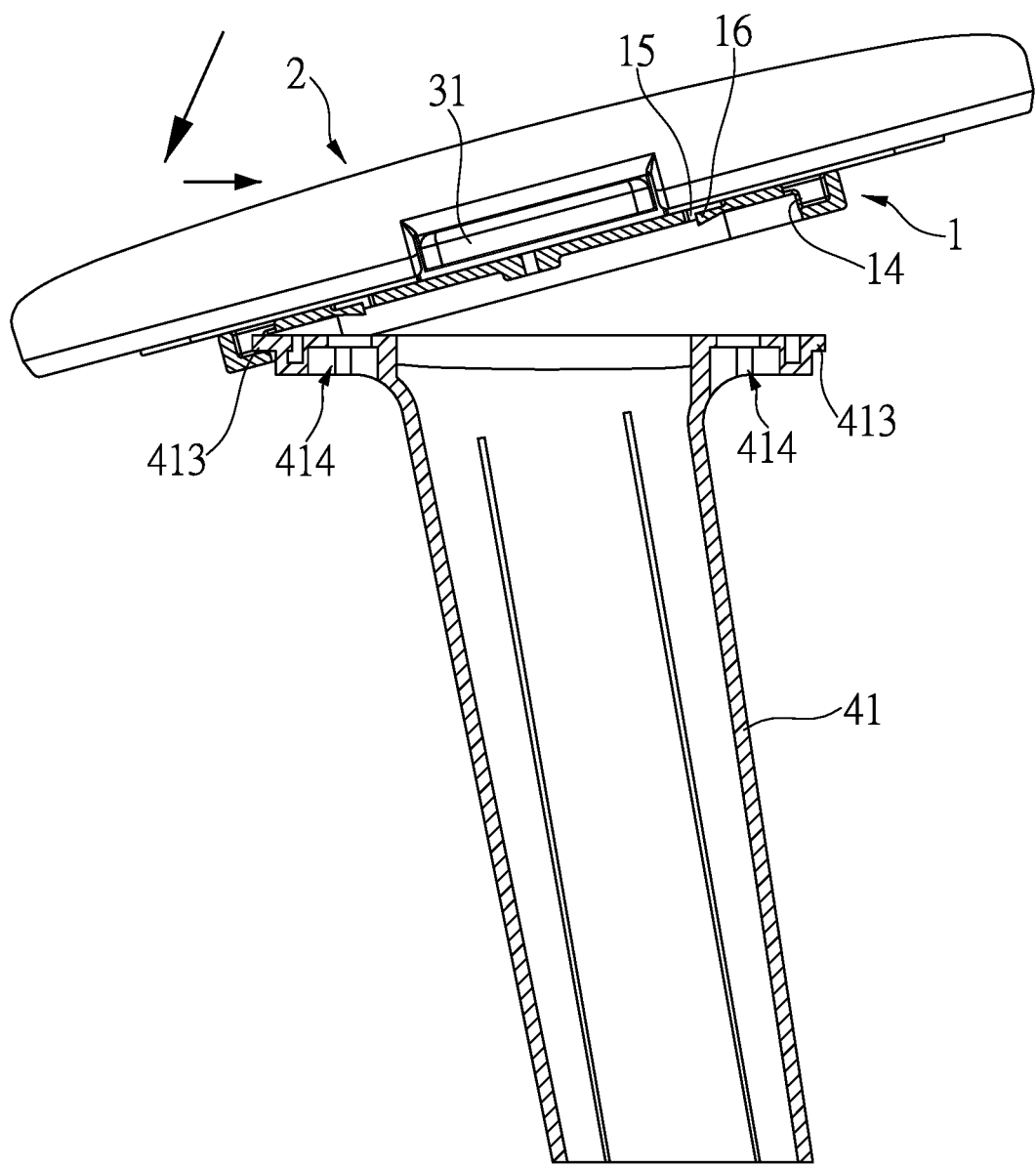
FIG. 37 is a schematic view showing an operation of inserting a base plate on an engaging plate into a buckling hole on an end of the base plate of FIG. 36.
Figure 38:
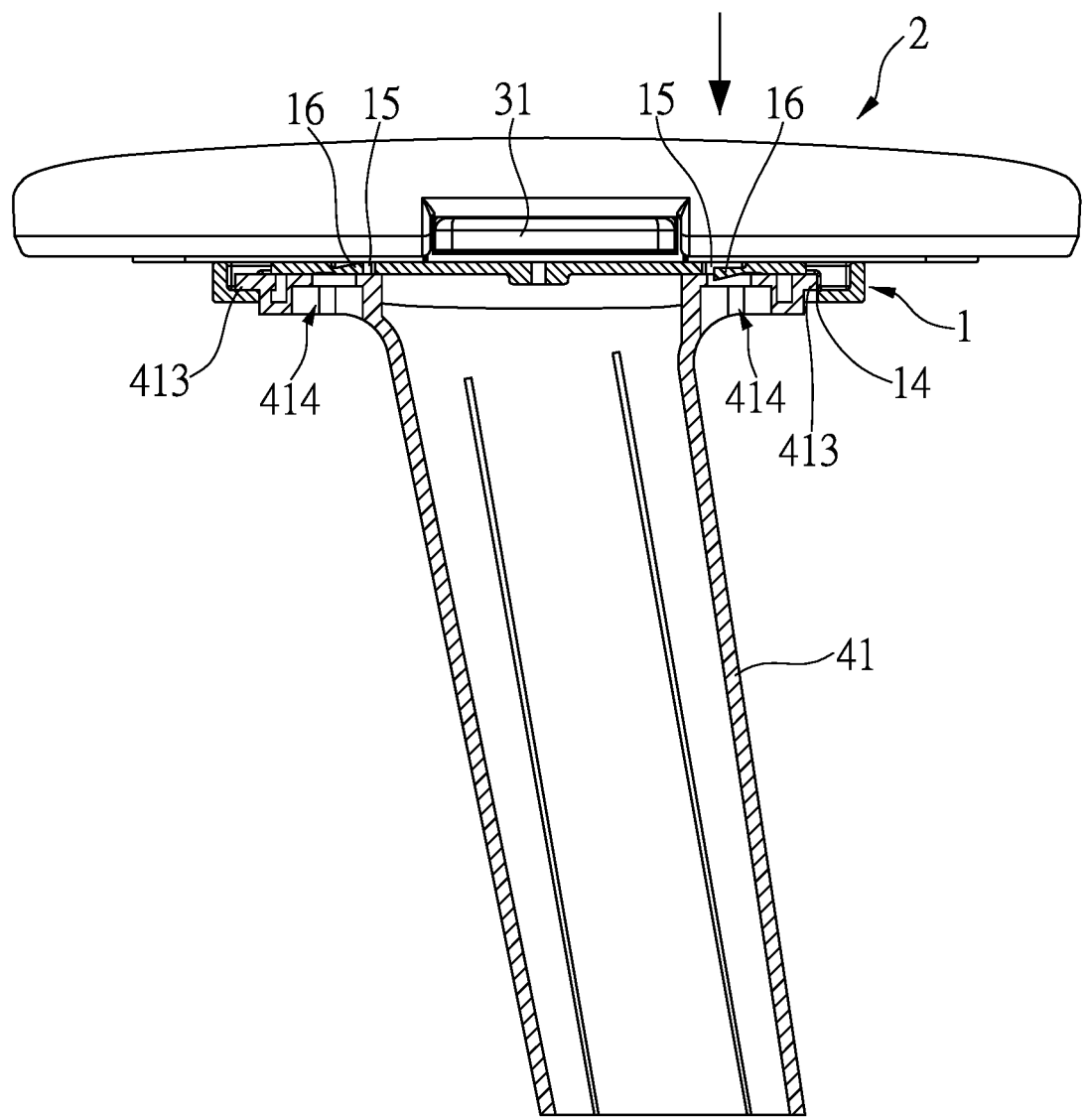
FIG. 38 is a schematic view showing an operation of downwardly moving and swinging the other end of the base plate toward the chair armrest.
Figure 39:
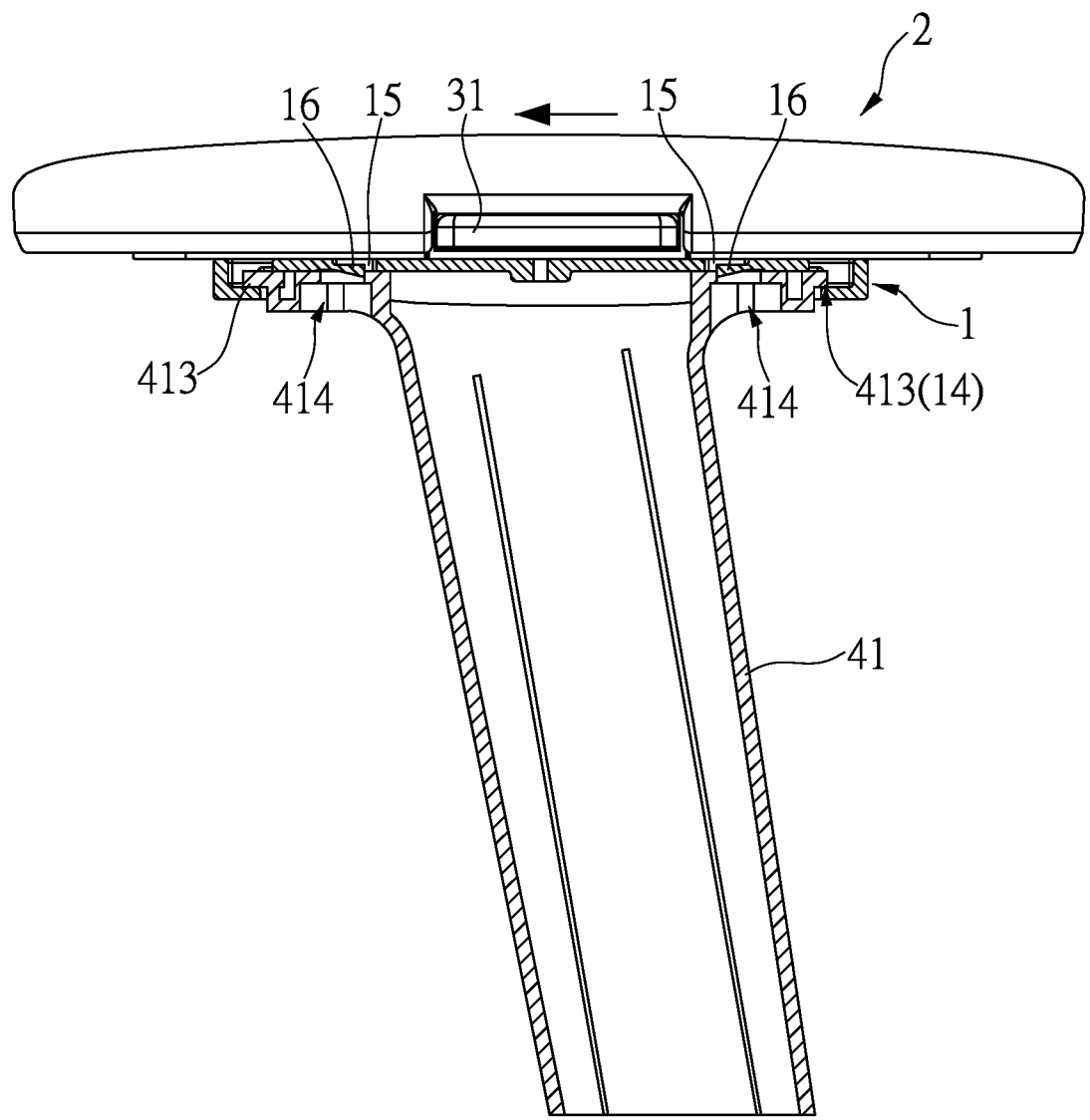
FIG. 39 is a schematic view showing an operation of moving a base plate relative to a chair armrest and elastically assembling an elastic buckling plate with an engaging part, according to FIG. 38.

Similarly, when the user wants to change the position of the pad body 2 in a lateral direction, the user can press the press control member 31 to release engagements between the teeth part 342 of the restraining teeth plate 34 and the arc teeth-row 336 of the teeth disk member 332 and between the teeth part 342 of the restraining teeth plate 34 and the lateral teeth row 334 of the main body 331, and at this time, the pad body 2 can be pushed to move along the X axis 20 in the lateral direction; because of assembly of the horizontal sliding shaft set 33 and the locking pin 11, the horizontal sliding shaft set 33 is not moved, but the parts, which are other than the horizontal sliding shaft set 33, of the slide control assembly 3 and the pad body 2 are moved in above-mentioned operation. The pad body 2 is laterally moved in a direction of a hole shape of the longitudinal hole 322, as shown in FIGS. 16 to 18 with auxiliary of FIGS. 5, 5A and 11 to 13. Furthermore, when the user wants to change a swing direction of the pad body 2 but not longitudinal or lateral movement of the pad body 2, the user can similarly press the press control member 31 to release the engagements between the teeth part 342 of the restraining teeth plate 34 and the arc teeth-row 336 of the teeth disk member 332 and between the teeth part 342 of the restraining teeth plate 34 and the lateral teeth row 334 of the main body 331, so that the user can directly push the pad body 2 to pivotally swing; the main body 331 and the teeth disk member 332 of the horizontal sliding shaft set 33 are pivotably assembled with each other, and the teeth disk member 332 is fastened with the locking pin 11, so the main body 331 can be pivoted relative to the teeth disk member 332 to make the pad body 2 rotate and swing between the X axis 20 and the Y axis 30, as shown in FIGS. 19 to 21 with auxiliary of FIGS. 5, 5A and 11 to 13. After the adjusting operations in aforementioned directions are completed, the user just needs to release the pressing force applied on the press control member 31, the bottom base plate 35 can be pushed back to the original position by the elastic energy released from the elastic pin 352 disposed on the end of the bottom base plate 35, and at the same time, the restraining teeth plates 34 are also pushed back to the original positions by elastic force of the elastic member 343, and the restraining teeth plates 34 are also moved toward the horizontal sliding shaft set 33 under cooperation of the protrusions 341 and the tracks 353, so that the teeth parts 342 of the restraining teeth plates 34 can be engaged with the arc teeth-row 336 of the teeth disk member 332 and the lateral teeth row 334 of the main body 331, respectively, thereby limiting the position of the pad body 2 after the adjusting operation, to provide the user to place hand on the pad body 2 most comfortably, as shown in FIGS. 2, 6, 16 and 19.

Figure 4:
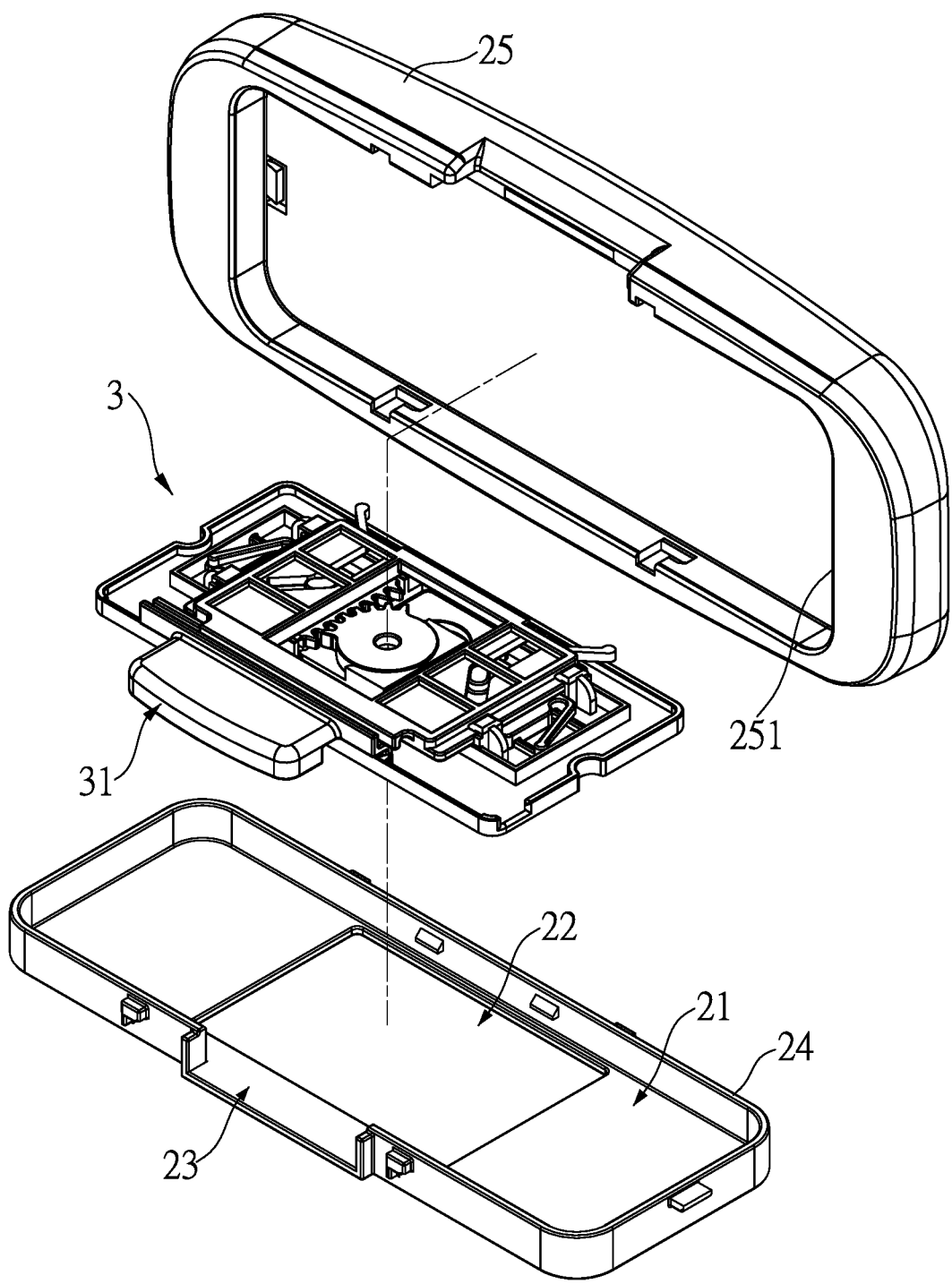
FIG. 4 is a perspective exploded view of a pad body and a slide control assembly of the present invention.

The pad body 2 further includes a bottom casing member 24 and a soft member 25, the bottom casing member 24 is in a box shape, and the soft member 25 is used to cover and seal the bottom casing member 24. The through hole 23 and the sliding hole 22 are disposed on the bottom casing member 24, the soft member 25 has an insertion slot 251 recessed on a side thereof, and the bottom casing member 24 is inserted into the insertion slot 251 to form the receiving portion 21, so that the user can place hand on the soft member 25 for rest, as shown in FIG. 4. Furthermore, the main reason that the press control member 31 can drive and control the bottom base plate 35 to act simultaneously is described in following paragraphs. The bottom base plate 35 includes a buckling member 354 disposed on the end thereof assembled with the press control member 31. The buckling member 354 is L-shaped, and the press control member 31 further includes a press control part 311 and a buckling part 312, an end of the press control part 311 is exposed out of the through hole 23, and other end of the press control part 311 is connected to the buckling part 312, the buckling part 312 is J-shaped and has a buckling groove 313 recessed thereon and corresponding in position to the buckling member 354, so when the press control part 311 is pressed, the press control member 31 can be buckled with the buckling member 354 through the buckling groove 313, and the bottom base plate 35 can be driven to move toward the end, where the elastic pins 352 are disposed, of the bottom base plate 35, and the elastic pins 352 are elastically abutted against the sidewall of the bottom casing member 24 to store elastic energy, and when the pressing force applied on the press control part 311 disappears, the bottom base plate 35 can be pushed back to original position by the stored elastic energy of the elastic pins 352, and ready for next pressing control operation of the press control member 31, as shown in FIGS. 5, 6, 8, 10, 12 and 13.

Following the above description of the bottom base plate 35, in order to fix the position of the pad body 2 and prevent undesired movement of the pad body 2 after the adjusting operation, the buckling part 312 of the press control member 31 further includes a teeth part 314 disposed on an end thereof opposite to the buckling groove 313, and the longitudinally-slidable plate 32 includes a long teeth-row member 325 disposed on a face, where the plurality of engaging frames 323 are disposed, thereof; the long teeth-row member 325 is disposed adjacent to the surrounding wall 324, the buckling part 312 of the press control member 31 is inserted into the through hole 23, the press control member 31 is buckled with the buckling member 354 through the buckling groove 313, and the teeth part 314 is engaged with the long teeth-row member 325. As a result, the pressing and releasing operations of the press control member 31 can control the engagements between the teeth part 314 and the long teeth-row member 325, and between the two restraining teeth plates 34 and the horizontal sliding shaft set 33, and after the position adjusting operation of the pad body 2 is confirmed, the pressing force applied on the press control member 31 can be released, and at this time, the teeth part 314 can be engaged with the long teeth-row member 325, so as to limit the position of the pad body 2 after the adjusting operation, as shown in FIGS. 5, 5A, 9 and 12.

Figure 13:
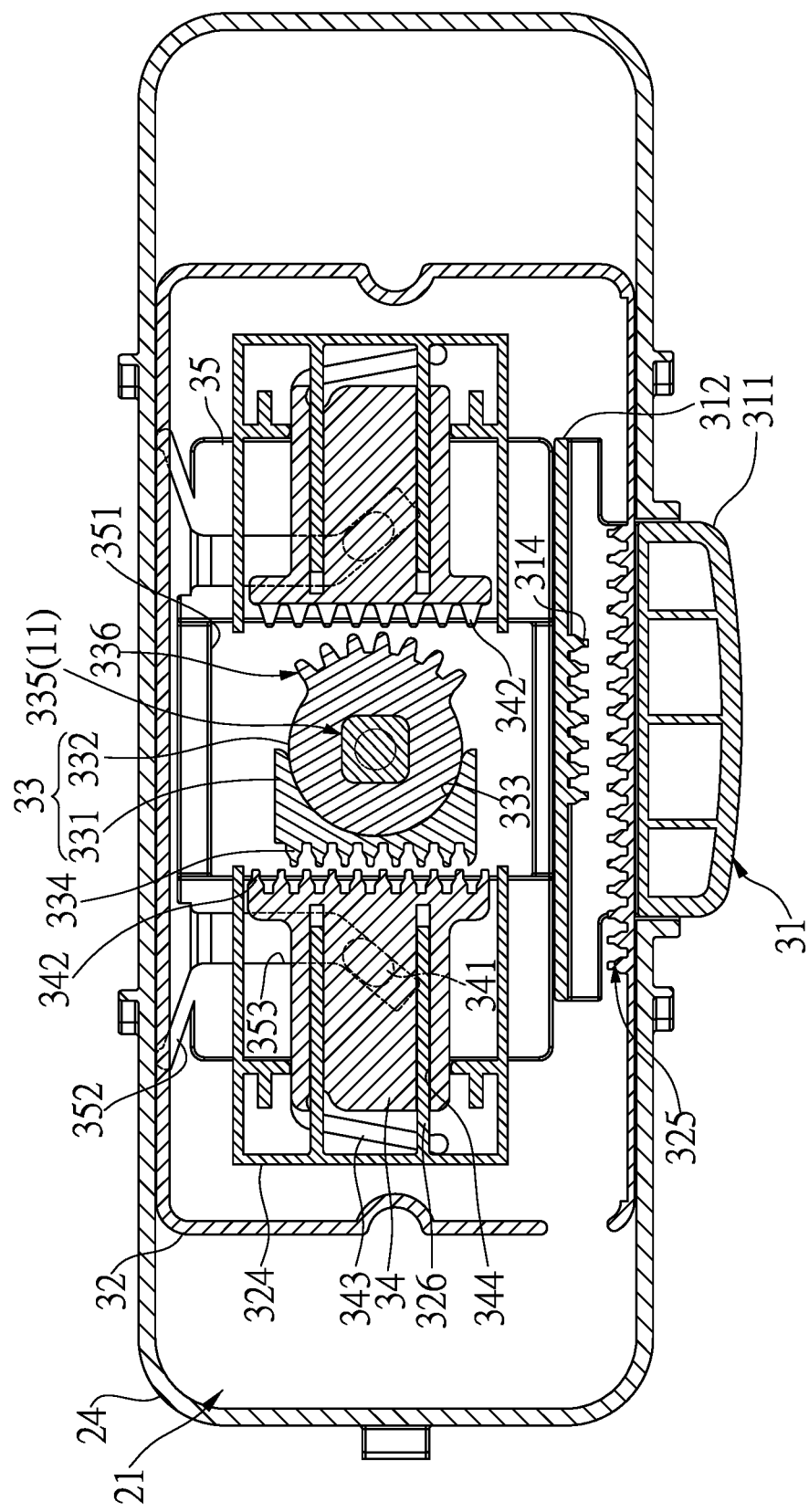
FIG. 13 is a cross-sectional schematic view of FIG. 12, when viewed from another direction.
Figure 14:
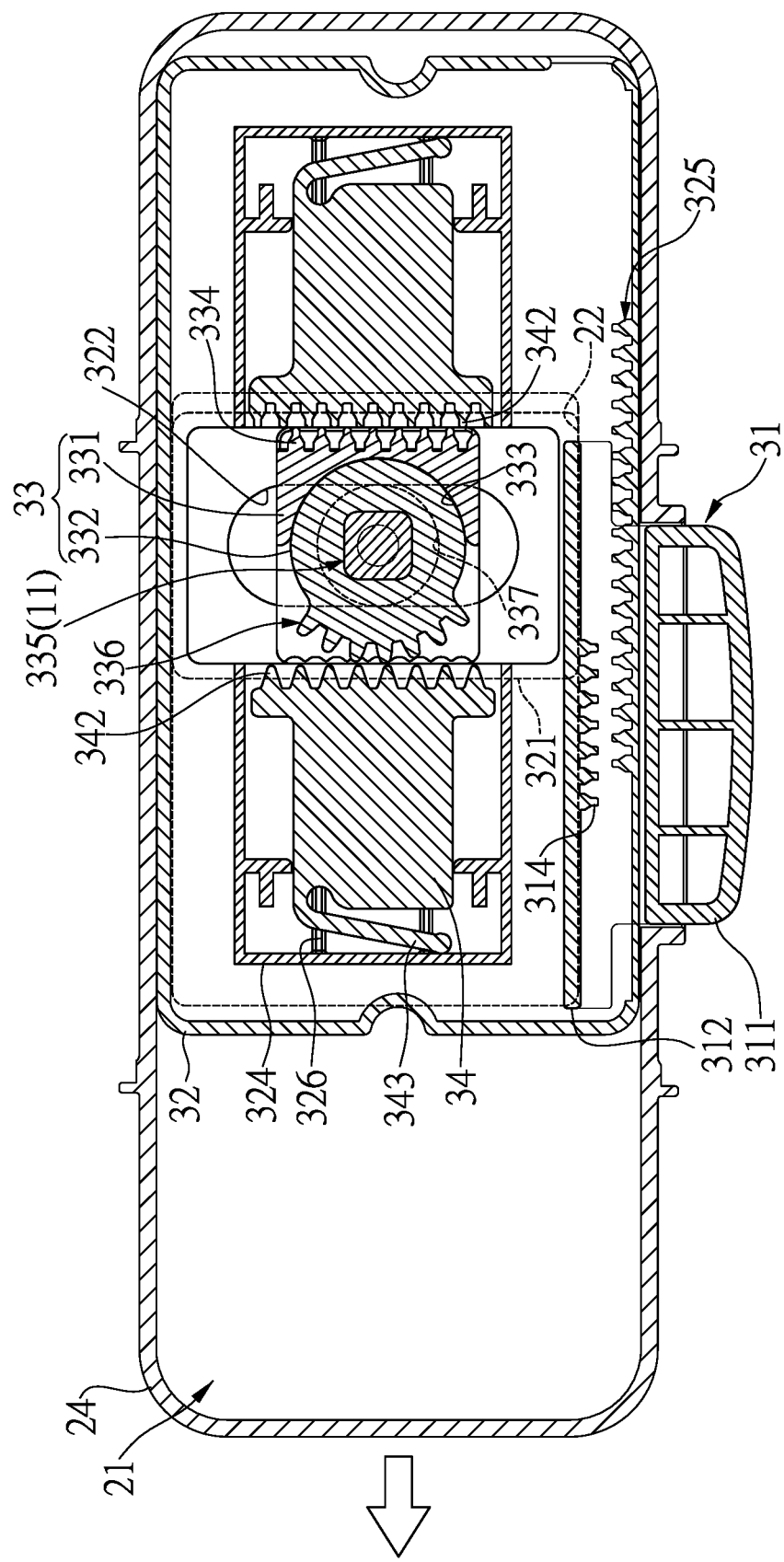
FIG. 14 is a schematic view showing movement of the pad body of FIG. 12.
Figure 15:
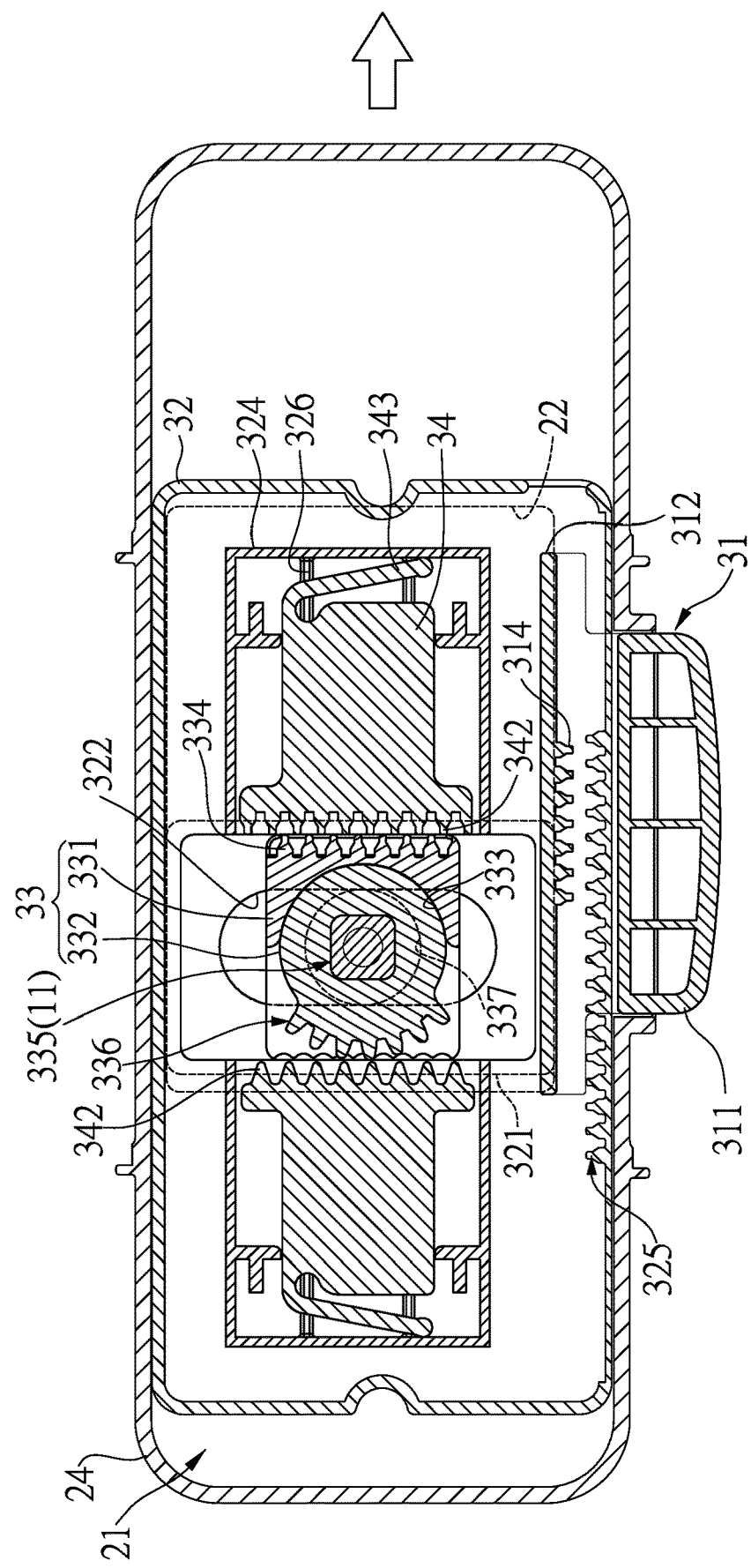
FIG. 15 is a schematic view showing movement of the pad body of FIG. 12 in another direction.

It is worth noting that each of the two restraining teeth plates 34 can have a plurality of track slots 344 recessed on a side thereof corresponding to the longitudinally-slidable plate 32, the longitudinally-slidable plate 32 has a plurality of track members 326 protruded thereon and corresponding in position and number to the track slots 344 of the two restraining teeth plates 34, the track members 326 are respectively inserted to the track slots 344 to limit the movements of the two restraining teeth plates 34, so as to enable the two restraining teeth plates 34 to move stably and smoothly without departing from preset paths. When the press control member 31 is pressed to drive the bottom base plate 35 to move, the movements of the two restraining teeth plates 34 can be controlled under the cooperation between the tracks 353 and the protrusions 341, and the restraining teeth plate 34 can be moved stably without drifting under cooperation between the track slots 344 and the track members 326, as shown in FIG. 13 with auxiliary of FIGS. 5 and 5A.

Figure 5:
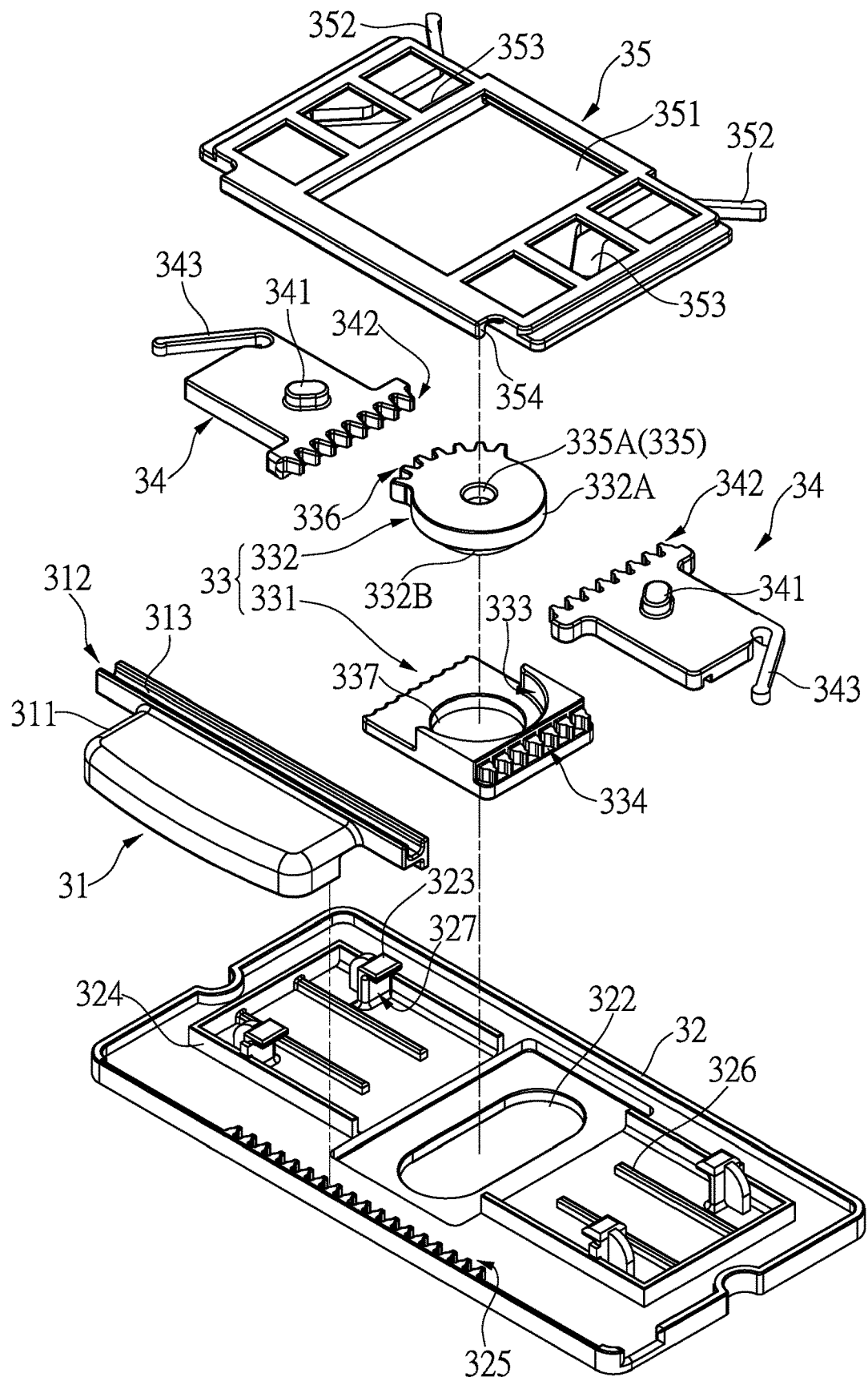
FIG. 5 is a perspective exploded view of a slide control assembly of the present invention.
Figure 5A:
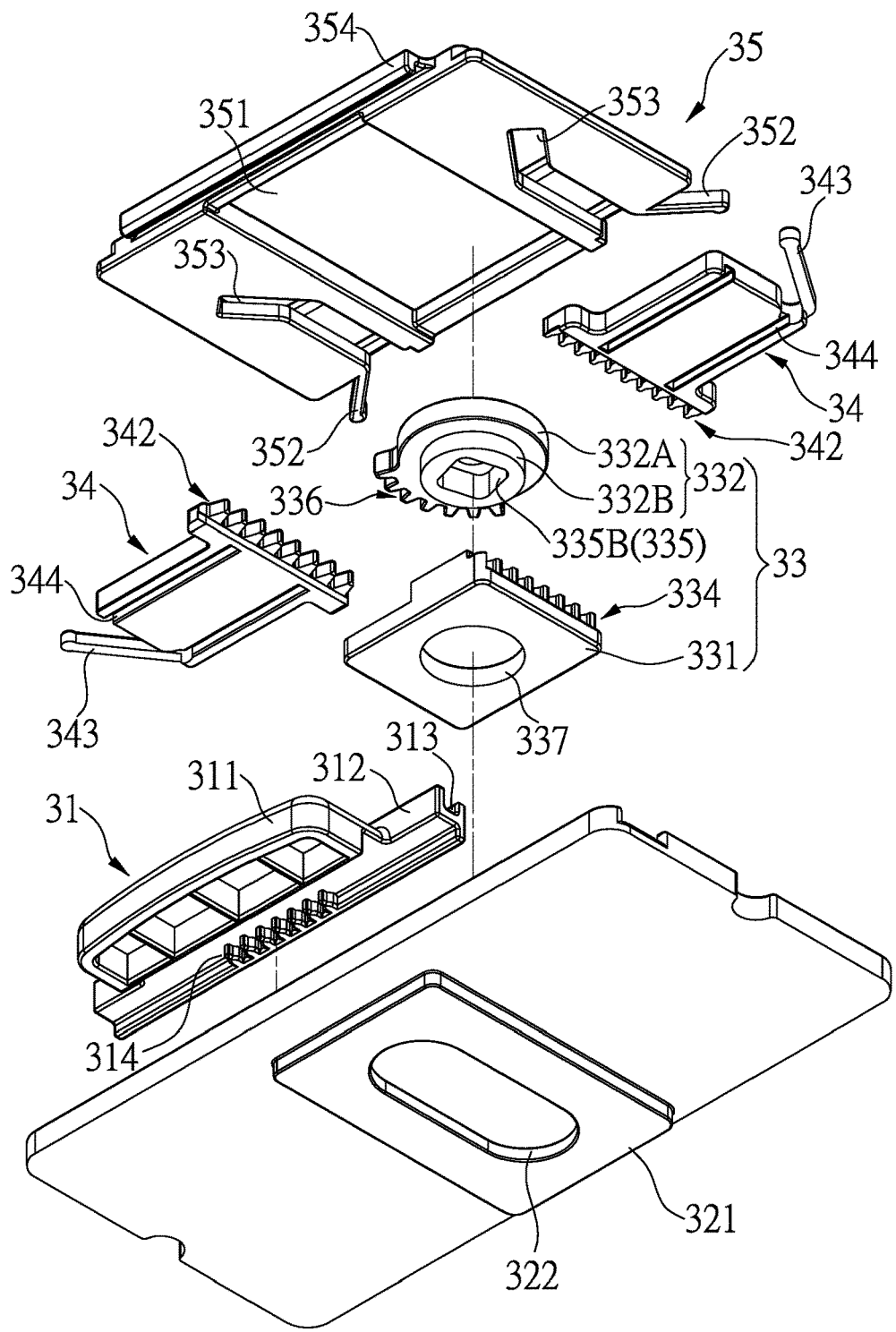
FIG. 5A is a perspective exploded view of a slide control assembly of the present invention, when viewed from another angle.
Figure 6:
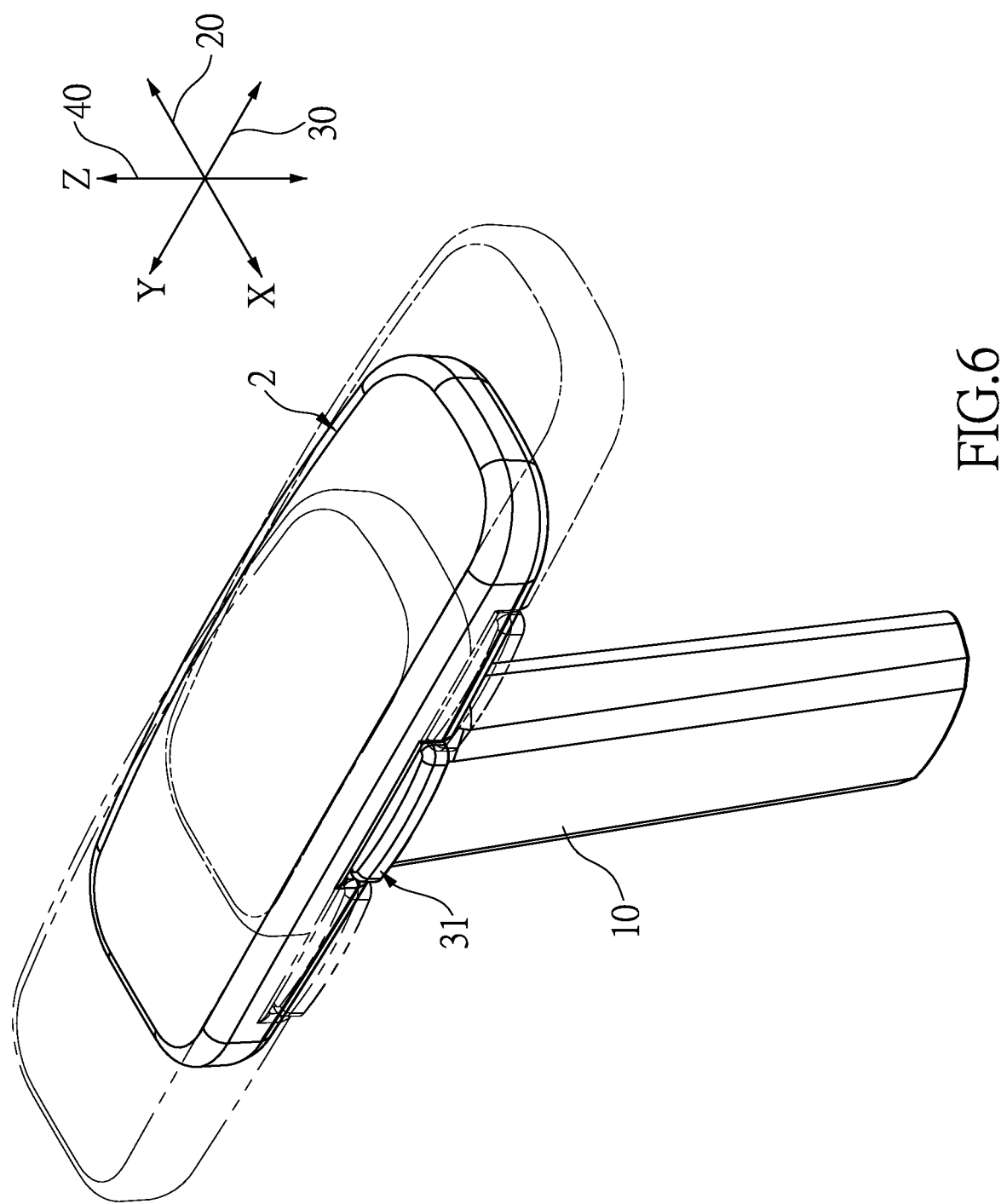
FIG. 6 is a perspective view of a pad body moving relative to a chair armrest in a longitudinal direction, according to the present invention.
Figure 7:
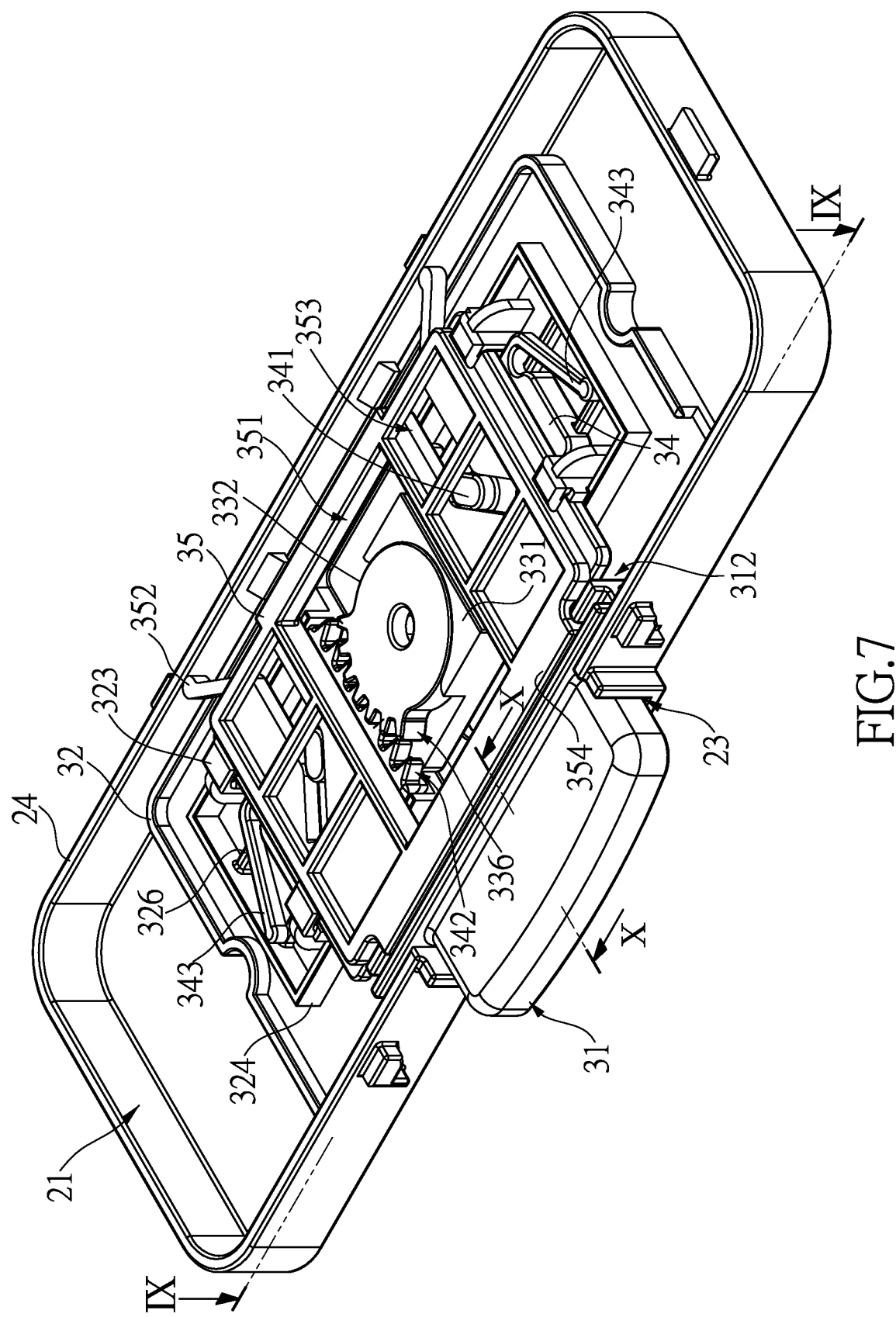
FIG. 7 is a perspective view of a slide control assembly located in a pad body of the present invention, when a press control member is not pressed yet.
Figure 8:
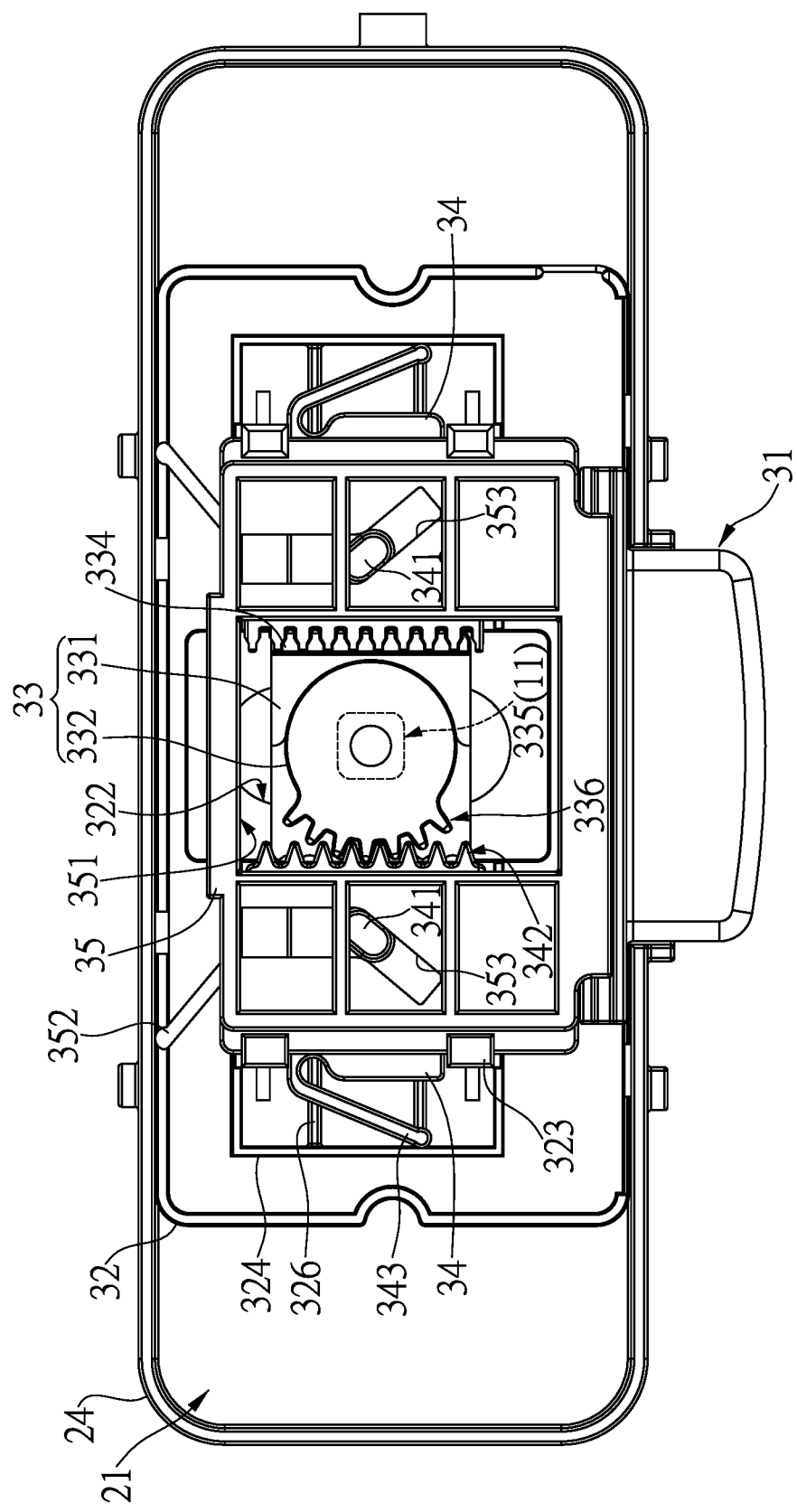
FIG. 8 is a schematic top plan view of FIG. 7.
Figure 9:
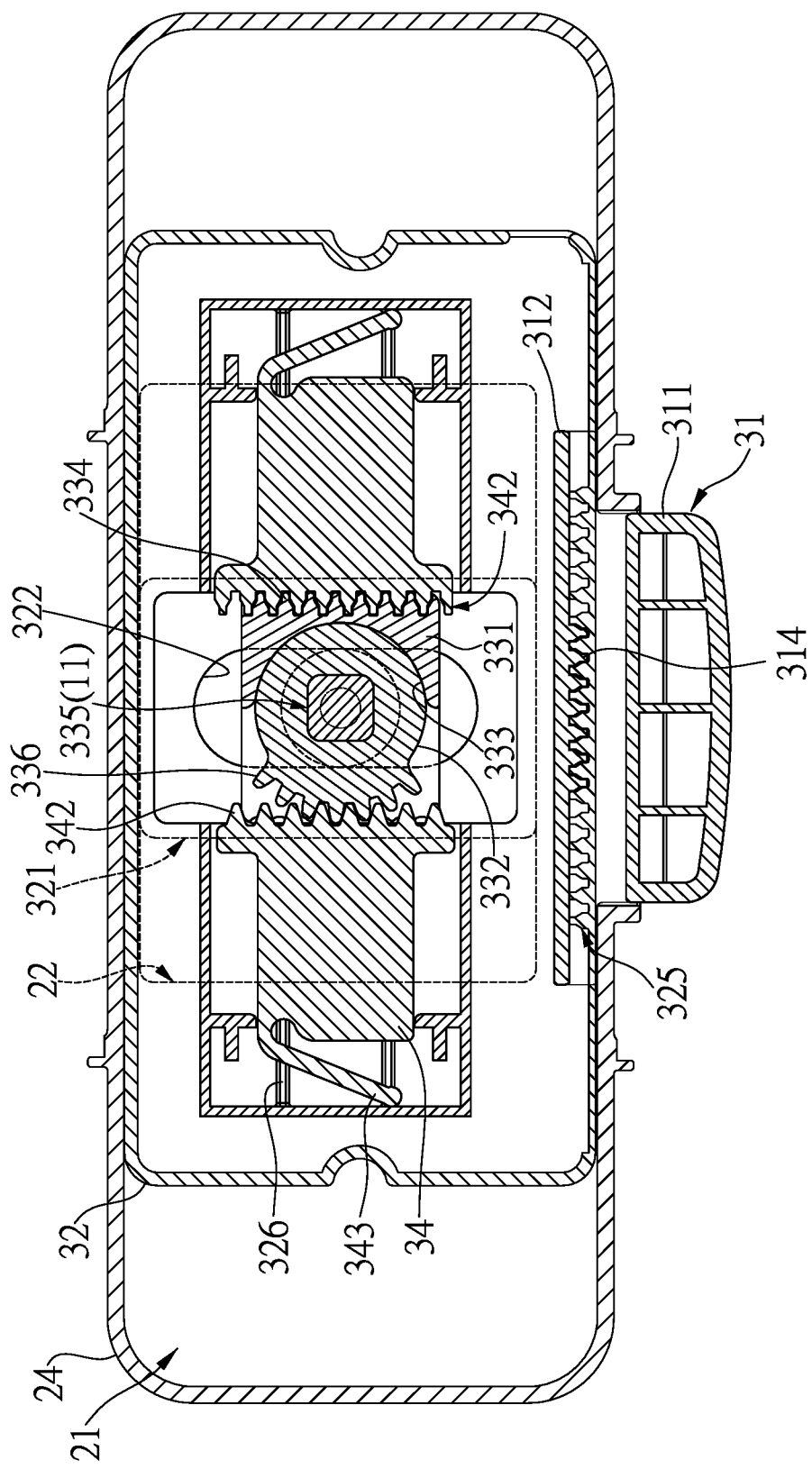
FIG. 9 is a schematic cross-sectional view taken along IX-IX of FIG. 7.
Figure 10:
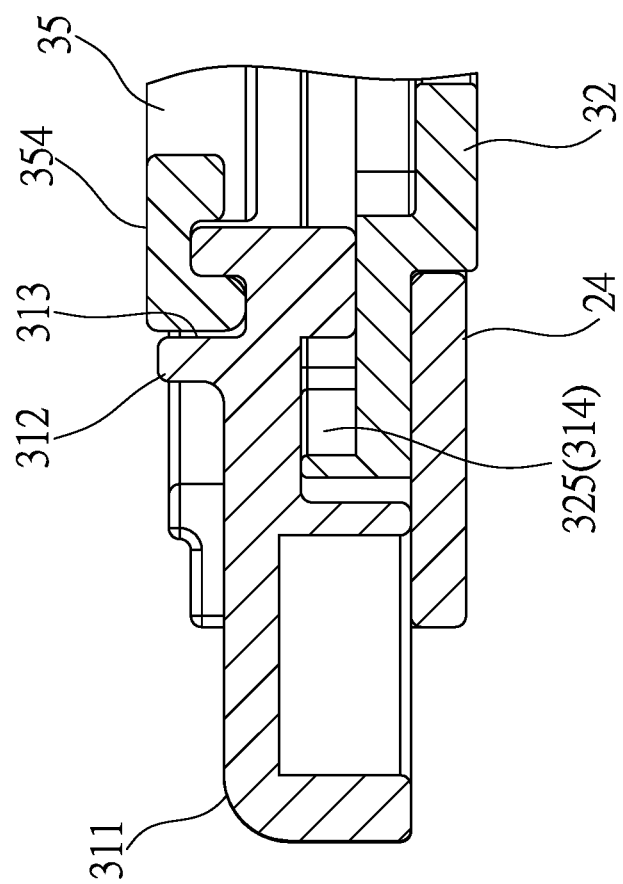
FIG. 10 is a schematic cross-sectional view taken along X-X of FIG. 7.
Figure 11:
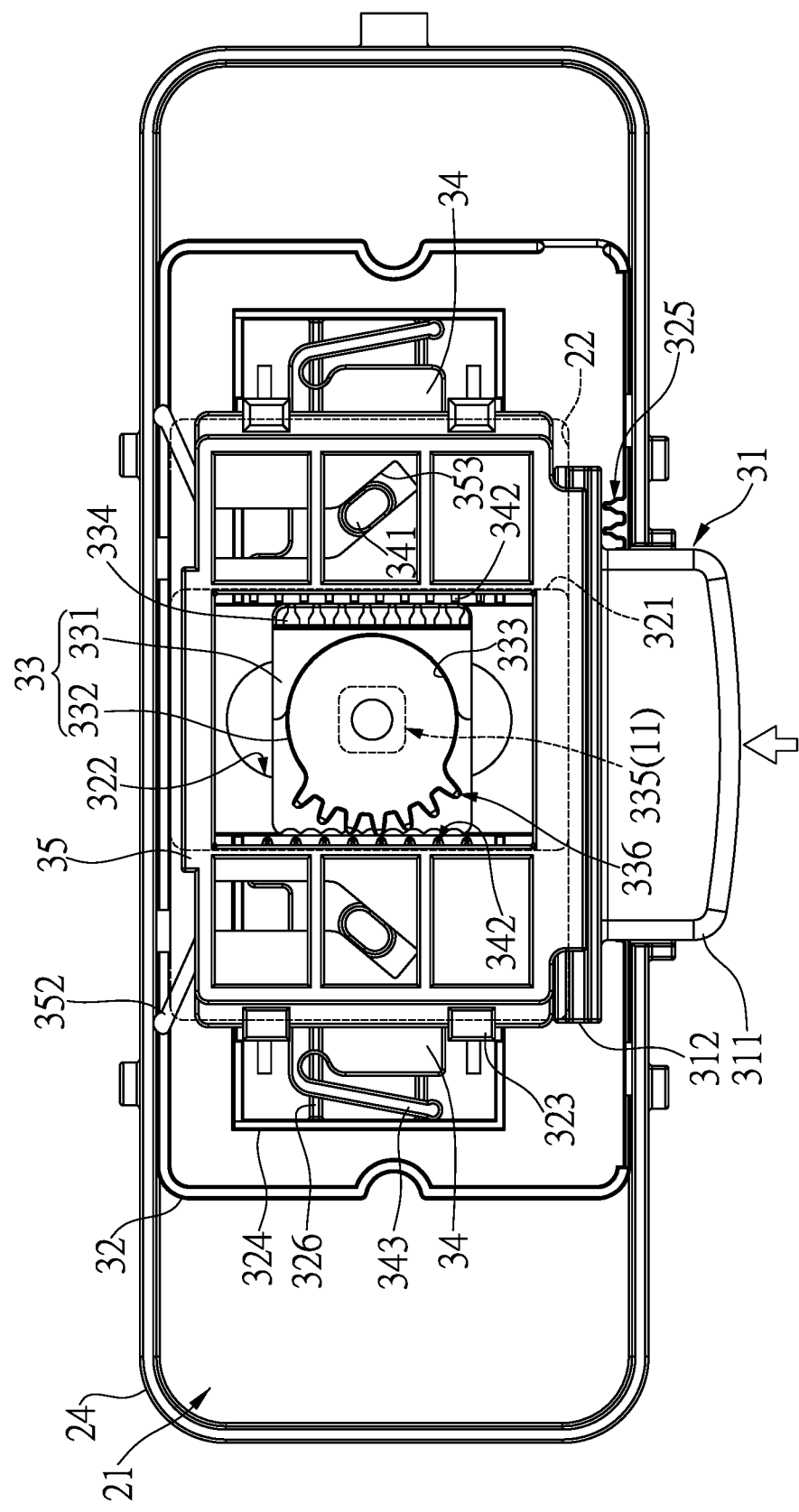
FIG. 11 is a schematic view of an operation of pressing the press control member to control movements of two restraining teeth plates and a bottom base plate, and release engagements between two restraining teeth plates, an arc teeth-row and a lateral teeth row.
Figure 12:
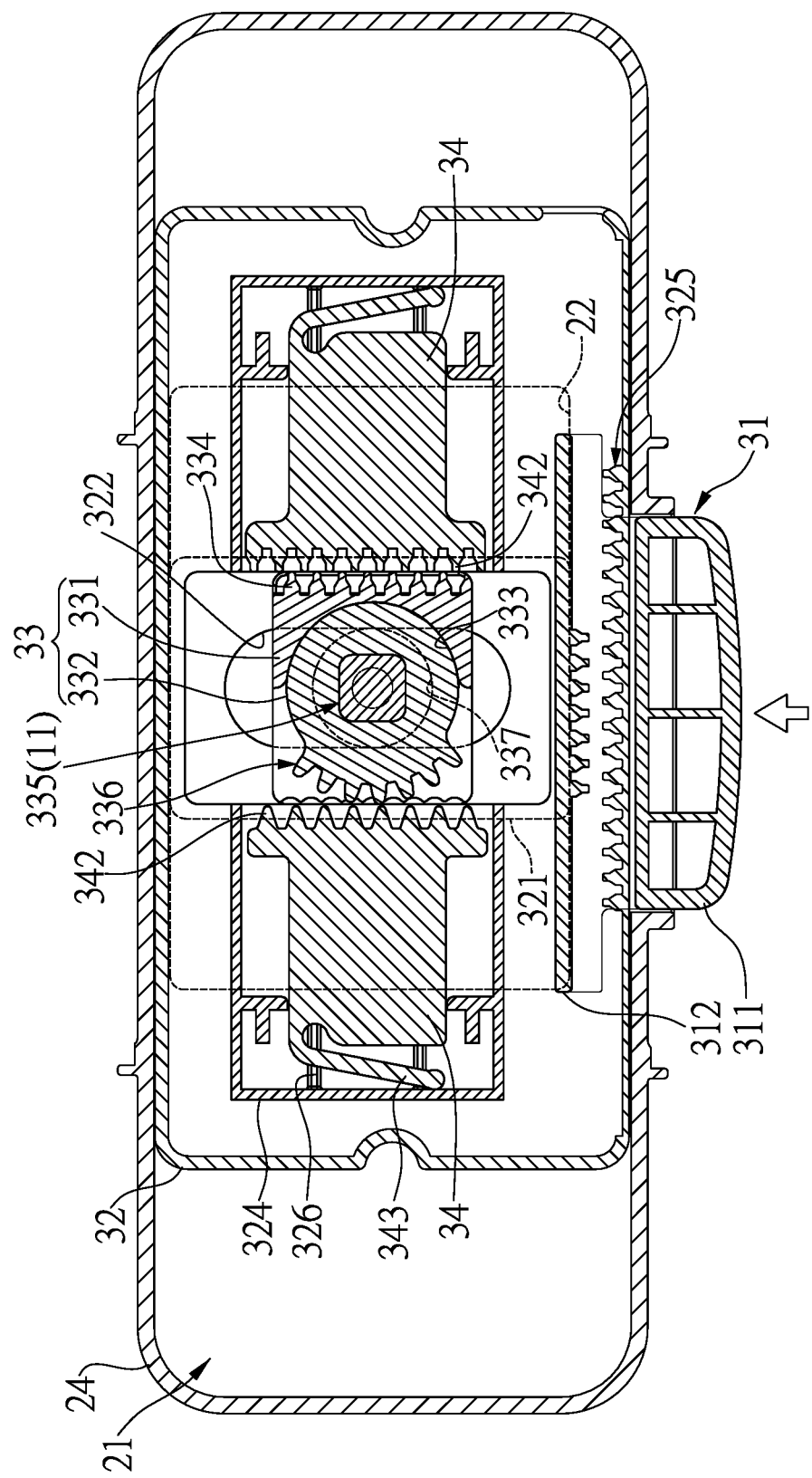
FIG. 12 is schematic view of an operation of pressing the press control member to control the movements of the two restraining teeth plates and the bottom base plate and release engagements between two restraining teeth plates, the arc teeth-row and the lateral teeth row, according to FIG. 9.

The horizontal sliding shaft set 33 is a main member of the armrest pad of the present invention, and can be used to change the position of the pad body 2 in longitudinal direction and lateral direction; furthermore, the curved groove 333 of the main body 331 can have an assembly hole 337 cut through a groove bottom face thereof, and the assembly hole 337 is a circular hole, the teeth disk member 332 further includes an upper disk part 332A and a lower pivot part 332B, the lower pivot part 332B of the teeth disk member 332 is inserted into the assembly hole 337 to form a pivot relationship between the teeth disk member 332 and the main body 331, and the upper disk part 332A is attached with the groove bottom face of the curved groove 333. Furthermore, the shaft hole 335 is divided into a circular section 335A and a square section 335B respectively corresponding to the upper disk part 332A and the lower pivot part 332B, a shape of the positioning part 111 of the locking pin 11 is the same as a hole shape of the square section 335B, and a sharp of the pivot part 112 is the same as a hole shape of the circular section 335A; with this configuration, the teeth disk member 332 can be engaged and assembled with the locking pin 11 reliably, so that the main body 331 can be rotated along the X axis 20 and the Y axis 30 relative to the teeth disk member 332 when the pad body 2 is rotated, and the problem that the teeth disk member 332 may be self-rotated to affect rotation and swing of the pad body 2 can be prevented, as shown in FIGS. 3, 5, 5A, 20 and 21. Furthermore, the engaging frame 323 disposed on the longitudinally-slidable plate 32 is in an inverted-L shape, and a fastening groove 327 can be formed between each engaging frame 323 and the longitudinally-slidable plate 32, two ends of the bottom base plate 35 are inserted into and engaged with the fastening grooves 327, respectively, so that the bottom base plate 35 can be stably disposed on the longitudinally-slidable plate 32 without falling off, as shown in FIG. 5.

In summary, the press control member 31 can be pressed to control movement of the bottom base plate 35, to release engagements between the two restraining teeth plates 34 and the horizontal sliding shaft set 33, so as to adjust the position of the pad body 2; when the pad body 2 is moved along the Y axis 30, the position of the slider 321 disposed on the bottom of the longitudinally-slidable plate 32 in the sliding hole 22 can be changed because of movement of the pad body 2; when the pad body 2 is moved along the X axis 20, the position of the horizontal sliding shaft set 33 in the lateral hole 351 can be changed under cooperation between the horizontal sliding shaft set 33 and the locking pin 1I; when the pad body 2 is pivotally swung about the X axis 20 or the Y axis 30, the main body 331 can be pivoted relative to the teeth disk member 332 because the teeth disk member 332 of the horizontal sliding shaft set 33 is engaged with the locking pin 11, and the pivotal swing operation of the pad body 2 can change the position of the main body 331 relative to the teeth disk member 332. After the aforementioned adjusting operations are confirmed, the press control member 31 can be released, the teeth parts 342 of the two restraining teeth plates 34 can be engaged with the lateral teeth row 334 of the main body 331 and the arc teeth-row 336 of the teeth disk member 332, respectively; as a result, the adjustment of the pad body 2 can be completed, and the aforementioned adjusting operations can provide the users with different arm lengths to adjust the pad body 2 to the most appropriate position for optimal comfort according to hand lengths, hand actions and postures.

Please refer to FIGS. 36 to 39. In order to provide the user or the assembler to more quickly assemble the pad body 2 of the base plate 1 on the regulating assembly 4, the base plate 1 can be further provided with an assembly groove 13 recessed on a side thereof opposite to the locking pin 11, and the assembly groove 13 has buckling holes 14 respectively formed on two ends of a sidewall thereof, and a position of each buckling hole 14 is near the groove bottom of the assembly groove 13; the chair armrest 10 includes a plurality of engaging plates 102 protruded on an outer side edge of an end thereof assembled with the base plate 1, the number of the engaging plates 102 is equal to the number of the buckling holes 14, and each engaging plate 102 is rectangular sheet-shaped and extended outwardly. During the assembling process, the base plate 1 and the pad body 2 can be pivoted and assembled together first by buckling one of the buckling holes 14 with the corresponding one of the engaging plates 102, and simply speaking, the end, where the buckling hole 14 is disposed, of the base plate 1 is assembled with the corresponding one of the engaging plates 102 of the chair armrest 10 first, and the pad body 2 can then be moved downwardly to make another buckling hole 14 of the base plate 1 correspond in position to another engaging plate 102, and at this time, just one engaging plate 102 and one buckling hole 14 corresponding thereto are engaged with each other; and after engagements between the engaging plates 102 and the buckling holes 14 are completed, the pad body 2 can be slid in a direction between two ends, where the engaging plates 102 are disposed, of the chair armrest 10, and when the pad body 2 drives the base plate 1 to move, the another engaging plate 102 can be buckled with the corresponding buckling hole 14, so as to achieve the quick assembling effect. Furthermore, in order to make assembly between the base plate 1 and the chair armrest 10 more stable, holes 15 can be further formed on the groove bottom surface of the assembly groove 13 and on two sides of the locking pin 11, respectively, each of the holes 15 is disposed between the locking pin 11 and the buckling hole 14, and an elastic buckling plate 16 is extended from a lateral wall of each of the holes 15 and elastically abutted with and exposed out of the hole 15 in a normal state; the chair armrest 10 includes a plurality of engaging parts 101 disposed correspondingly in position to the elastic buckling plates 16. After being mounted on the chair armrest 10 through the base plate 1, the pad body 2 can be moved along the plurality of engaging plates 102, and one of the elastic buckling plates 16 on the holes 15 can be engaged and assembled with the corresponding engaging part 101. Simply speaking, in order to assemble the base plate 1 with the chair armrest 10, an end of the buckling hole 14 is sleeved on the engaging plate 102 on an end of the chair armrest 10, and the pad body 2 is then swung to make another buckling hole 14 move toward another engaging plate 102, so as to insert and engage the base plate 1 into the assembly groove 13; after the base plate 1 is engaged into the assembly groove 13, the pad body 2 can be moved along the positions of the engaging plates 102, so as to engage the engaging plates 102 and the buckling hole 14 which are not assembled with each other yet; furthermore, after the pad body 2 is moved completely, each elastic buckling plate 16 is gradually inserted into the corresponding engaging part 101 and can restore elasticity from an elastically deformable state in which the elastic buckling plate 16 is pushed by the engaging part 101, thereby securing assembly of the base plate 1 and the chair armrest 10. Furthermore, as shown in figures of an embodiment of the present invention, the two elastic buckling plates 16 are in cooperation with the two engaging parts 101, so as to provide the user and the manufacturer to assemble the base plate 1 and the chair armrest 10 without limitation in assembling direction; as a result, the pad body 2 can drive any end of the base plate 1 to quickly combine with the chair armrest 10, and the user and the manufacturer can save more working hour in assembly of the armrest pad of the present invention.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A multi-directional adjustable armrest pad, mounted on a top end of a chair armrest, and the multi-directional adjustable armrest pad comprising:
    a base plate sealed and assembled with a top face of the chair armrest and locked with the chair armrest, wherein the base plate comprises a locking pin protruded on a top thereof, a first end of the locking pin is connected to the base plate and used as a positioning part, and a second end of the locking pin is used as a pivot part:
    a pad body disposed on a top of the chair armrest and abutted with the base plate, wherein the pad body comprises a receiving portion disposed in the inside thereof, and the receiving portion has a sliding hole cut therethrough a bottom thereof, and a through hole cut therethrough a lateral side thereof, the locking pin of the base plate is inserted through the sliding hole and located inside the receiving portion:
    a slide control assembly disposed in the receiving portion, wherein the slide control assembly comprises a press control member, a longitudinally-slidable plate, a horizontal sliding shaft set, two restraining teeth plates and a bottom base plate, a first face of the longitudinally-slidable plate is attached with a bottom of the receiving portion, and the longitudinally-slidable plate has a slider protruded thereon and corresponding in position to the sliding hole, the slider has a longitudinal hole cut therethrough and corresponding in position to the locking pin, the slider is movable in the sliding hole, the locking pin is movable in a hole direction along the longitudinal hole, and the longitudinally-slidable plate comprises a second face and a plurality of engaging frames disposed on two ends of the second face thereof and arranged in interval, and the slide control assembly comprises a surrounding wall surrounding and framing the plurality of engaging frames;
    wherein two ends of the bottom base plate are engaged with the plurality of engaging frames, respectively, and the bottom base plate comprises a lateral hole formed thereon and corresponding in position to the longitudinal hole, one of the two ends of the bottom base plate is engaged with the press control member, and the bottom base plate has a plurality of elastic pins protruding on the other of the two ends thereof, each of the plurality of elastic pins has a first end connected to the bottom base plate, and a second end elastically abutting against an inner wall of the receiving portion, and the press control member has a first end engaged with the bottom base plate, and a second end extending out of the through hole:
    wherein the two restraining teeth plates are sandwiched between the bottom base plate and the longitudinally-slidable plate, and each of the two restraining teeth plates has a protrusion protruded thereon and corresponding to a side of the bottom base plate, and the bottom base plate has two tracks cut therethrough and corresponding m position to the protrusions of the two restraining teeth plates, respectively, and the two tracks are downwardly extending from the end of the bottom base plate where the plurality of elastic pins are disposed and then extending toward two sides of the bottom base plate, the two restraining teeth plates are moved close to or away from each other by moving the protrusions along the two tracks, each of the two restraining teeth plates has a teeth part disposed on a side thereof corresponding to the other of the two restraining teeth plates, and each of the two restraining teeth plates has an elastic member extending from an end thereof opposite to the teeth part, wherein each of the elastic members has a first end connected to the restraining teeth plate, and a second end elastically abutted with the surrounding wall;
    wherein the horizontal sliding shaft set is mounted on the locking pin and disposed between the two restraining teeth plates and in the lateral hole, the horizontal sliding shaft set further comprises a main body and a teeth disk member, the main body has a curved groove recessed thereon, and the main body has a lateral teeth row disposed on a side thereof and engaged with the teeth part of one of the two restraining teeth plates, the teeth disk member is assembled in the curved groove, the teeth disk member has a shaft bole cut therethrough, hole shapes of the shaft hole corresponds to that of the positioning part and the pivot part, and the teeth disk member is pivotally swingable relative to the mam body and has an are teeth-row disposed on a side thereof and engaged with the teeth part of the other of the two restraining teeth plates:

wherein when the press control member is pressed, engagements between the two restraining teeth plates and the horizontal sliding shaft set are released, the pad body is adjustable to move longitudinally and laterally and rotate about the chair armrest through cooperation between the longitudinal hole and the horizontal sliding shaft set, cooperation between the slider of the longitudinally-slidable plate and the through hole, and pivot cooperation between the main body and the teeth disk member.

2. The multi-directional adjustable armrest pad according to claim 1, wherein the pad body further comprises a bottom casing member and a soft member, the through hole and the sliding hole are disposed on the bottom casing member, the soft member has an insertion slot recessed on a side thereof, and the bottom casing member is inserted into the insertion slot to form the receiving portion;

wherein the base plate has an assembly groove recessed on a side thereof opposite to the locking pin, the assembly groove has buckling holes formed on two ends thereof, respectively, and the chair armrest comprises a plurality of engaging plates protruding on an outer side edge of an end thereof assembled with the base plate, and the number of plurality of engaging plates is equal to the number of the buckling holes, and when the base plate and the pad body are pivoted with each other, a first buckling hole of one of the buckling holes is buckled with a corresponding engaging plate of the plurality of engaging plates, and the pad body is then moved downwardly, a second buckling hole of the buckling holes of the base plate corresponds in position to a corresponding second engaging plate of the plurality of engaging plates, so as to slide the pad body and buckle one of the plurality of engaging plates with the corresponding one of the buckling holes, wherein the assembly groove has holes formed on a groove bottom face thereof and respectively located on two sides of the locking pin, a lateral wall of each of the holes has a clastic buckling plate extended therefrom, and the chair armrest comprises a plurality of engaging parts disposed correspondingly m position to the elastic buckling plate, and after the pad body is mounted on the chair armrest by the base plate, and when the pad body is moved along the plurality of engaging plates, the clastic buckle plate of one of the holes is engaged and assembled with the corresponding one of the plurality of engaging parts.

3. The multi-directional adjustable armrest pad according to claim 1, wherein the bottom base plate comprises a buckling member disposed on an end thereof assembled with the press control member, and the press control member further comprises a press control part and a buckling part, the press control part has first end exposed out of the through hole, and a second end connected to the buckling part, and the buckling part comprises a buckling groove recessed thereon and corresponding in position to a buckling member, when the press control part is pressed, the press control member is buckled with the buckling member through the buckling groove, and the bottom base plate is driven to move toward the end of the bottom base plate where the plurality of elastic pins are disposed, buckling member through the buckling groove, and the bottom base plate is driven to move toward the end of the bottom base plate where the plurality of elastic pins are disposed.

* * * * *